United States Patent [19]

Schacher

[11] Patent Number: 6,002,402

[45] Date of Patent: Dec. 14, 1999

[54] SYSTEM AND METHOD FOR PRODUCING A DRAG-AND-DROP OBJECT FROM A POPUP MENU ITEM

[75] Inventor: John L. Schacher, Beaverton, Oreg.

[73] Assignee: Symantec Corporation, Cupertino, Calif.

[21] Appl. No.: 08/843,661

[22] Filed: Apr. 9, 1997

[51] Int. Cl.[6] .................................................. G06F 3/00
[52] U.S. Cl. ......................................... 345/352; 345/348
[58] Field of Search ................................... 345/326–358, 345/978, 146

[56] References Cited

U.S. PATENT DOCUMENTS

| | | | |
|---|---|---|---|
| 4,656,603 | 4/1987 | Dunn | 345/348 |
| 4,931,783 | 6/1990 | Atkinson | 345/353 |
| 5,119,475 | 6/1992 | Smith et al. | 345/353 |
| 5,134,560 | 7/1992 | Ferriter et al. | 345/349 X |
| 5,276,795 | 1/1994 | Hoeber et al. | 395/156 |
| 5,305,435 | 4/1994 | Bronson | 345/342 |
| 5,317,687 | 5/1994 | Torres | 395/159 |
| 5,345,550 | 9/1994 | Bloomfield | 395/156 |
| 5,357,603 | 10/1994 | Parker | 395/156 |
| 5,485,175 | 1/1996 | Suzuki | 345/353 |
| 5,500,929 | 3/1996 | Dickinson | 345/357 |
| 5,535,422 | 7/1996 | Chiang et al. | 345/338 |
| 5,559,944 | 9/1996 | Ono | 395/156 |
| 5,566,295 | 10/1996 | Cypher et al. | 345/978 X |
| 5,581,670 | 12/1996 | Bier et al. | 345/146 X |
| 5,598,524 | 1/1997 | Johnston, Jr. et al. | 345/348 |
| 5,619,639 | 4/1997 | Mast | 345/326 |

*Primary Examiner*—John E. Breene
*Attorney, Agent, or Firm*—Fliesler, Dubb, Meyer & Lovejoy; Gideon Gimlan

[57] ABSTRACT

A method and apparatus are provided in conjunction with a graphical user interface (GUI) for producing drag-and-drop objects (317*b*) from one or more choice-items (317*a*) presented in a choice-listing menu of a source application program (314). The so-produced drag-and-drop object is dropped onto a receiving area (312*c*) and acquires new functionality based on the source of the choice-item and on the nature of the receiving area. A filename presented as a choice-item in a history portion of a FILE menu for example may be converted into a drag-and-drop object and dropped on an open desktop area. The dropped object (319) may be then activated to automatically launch the source application program and to automatically open the file identified by the original choice-item.

50 Claims, 10 Drawing Sheets

LEGEND FOR FIG. 2

| ITEM | DESCRIPTION(S) |
|---|---|
| 100 | COMPUTER SYSTEM |
| 150 | CENTRAL PROCESSING UNIT OR OTHER DATA PROCESSING MEANS, INSTRUCTABLE MACHINE |
| 155 | SYSTEM BUS |
| 160 | SYSTEM MEMORY |
| 170 | NON-VOLATILE MASS STORAGE MEANS; (E.G. HARD DISK DRIVE, FLOPPY DRIVE, CD-ROM DRIVE, RE-WRITABLE OPTICAL DRIVE) |
| 175 | COMPUTER-READABLE MEDIA (E.G. FLOPPY DISKETTE, CD-ROM OPTICAL PLATTER); INSTRUCTING DEVICE FOR INSTRUCTING CPU 150 |
| 180 | INPUT/OUTPUT MEANS |
| 190 | COMMUNICATIONS NETWORK |
| API | APPLICATION PROGRAM INTERFACE |
| OS | OPERATING SYSTEM; GUI-TYPE OS (E.G., MICROSOFT WINDOWS95™) |

FIG. 2A

LEGEND FOR FIG. 3

| ITEM | DESCRIPTION(S) |
|---|---|
| 311 | SCREEN AREA |
| 314 | WORD PROCESSING APPLICATION WINDOW |
| 316 | SCROLLED-DOWN, FIRST CHOICE-LISTING MENU |
| 317 | UNFURLED SIDE MENU SHOWING HISTORICAL LISTING OF CHOICE- ITEMS |
| 317a | SELECTED CHOICE-ITEM AT BEGINNING OF DRAG-AWAY AND-DROP OPERATION |
| 317b | SELECTED CHOICE-ITEM IN MIDDLE OF DRAG-AWAY AND-DROP OPERATION (THE GENERATED, IN-DRAG OBJECT) |
| 318 | CURSOR PULLING THE IN-DRAG OBJECT TOWARD DROP DESTINATION 312c |
| 312c | THE USER-CHOSEN, EMPTY DESKTOP REGION INTO WHICH THE IN-DRAG OBJECT 317b WILL BE DROPPED (THE TARGET AREA) |
| 319 | THE ULTIMATELY-DROPPED AND NEW, USER-ACTIVATABLE OBJECT AT THE END OF THE DRAG-AWAY AND-DROP OPERATION |

FIG. 3A

LEGEND FOR FIG. 6

| ITEM | DESCRIPTION(S) |
|---|---|
| 616 | FIRST UNFURLED, FILE HISTORY MENU FROM WHICH OBJECT 619a IS FORMED USING A CHOICE-ITEM DRAG-AWAY AND DROP OPERATION |
| 617 | SECOND DROPPED MENU (CONTAINING CHOICE-ITEMS REPRESENTING EDITING FUNCTIONS) FROM WHICH OBJECT 619b IS FORMED USING A CHOICE-ITEM DRAG-AWAY AND DROP OPERATION |
| 619a | FIRST DRAGGED-AND-DROPPED OBJECT (CREATED BY RIGHT-DRAGGING THE MY_FILE4 CHOICE-ITEM FROM MENU 616) |
| 619b | SECOND DRAGGED-AND-DROPPED OBJECT (CREATED BY RIGHT-DRAGGING THE COPY CHOICE-ITEM FROM MENU 617). CLICKING ON THIS COPY_TO_CLIP OBJECT CAUSES A COPYING OF WHATEVER IS SELECTED IN WORDPROCESS WINDOW 614 TO THE SYSTEM CLIPBOARD |
| 618 | 'MACRO' PORTION OF AN UNFURLED TOOLS MENU |
| 624 | THIS PAIR OF DASHED LINES REPRESENTS THE CONVERSION OF THE MACRO PLAYBACK CHOICE-ITEM IN 618 INTO A DRAG-AND-DROP OBJECT AND THE DROPPING OF THAT OBJECT INTO TOOL BAR 620 SO THAT PLAYBACK BECOMES A SELECTABLE TOOL (SHOWN AS TAPE REELS) WITHIN TOOL BAR 620 |
| 634 | THIS PAIR OF DASHED LINES REPRESENTS A SHRINKING OF WINDOW 614 AND ITS MOVEMENT INTO THE FORM OF A 'MINIMIZED' TASK BUTTON 632 IN TASK BAR 630 |
| 633 | THIS TASK BUTTON IS A MINIMAL REPRESENTATION OF A SPREADSHEET WINDOW THAT IS NOT OTHERWISE SHOWN ON THE DESKTOP, BUT FROM WHICH WINDOW OBJECT 689 IS FORMED BY WAY OF CHOICE-ITEM DRAG-AWAY AND DROP OPERATION 684 |
| 654 | THIS PAIR OF DASHED LINES REPRESENTS THE BEGINNING OF A RIGHT-DRAGGING OPERATION THAT PULLS THE XYZSITE CHOICE-ITEM FROM THE FAVORITES MENU 677 AND DROPS THE RESULTING OBJECT ONTO THE OPEN DESKTOP 612 AS AN EXECUTABLE, SITE-VISITING OBJECT 679a |
| 655 | THIS PAIR OF DASHED LINES REPRESENTS THE BEGINNING OF A RIGHT-DRAGGING OPERATION THAT PULLS THE SAVE_AS CHOICE-ITEM FROM FILE MENU 676 AND DROPS THE RESULTING OBJECT ONTO THE OPEN DESKTOP 612 AS AN EXECUTABLE, DATA-SAVING OBJECT 679b THAT SAVES DATA OBTAINED IN BROWSER WINDOW 674 UNDER A USER-PROVIDED FILE NAME (A SAVE-AS NAME) |

FIG. 6A

LEGEND FOR FIG. 6 CONTINUED

| ITEM | DESCRIPTION(S) |
|---|---|
| 684 | THIS PAIR OF DASHED LINES REPRESENTS A RIGHT-DRAGGING OF A HISTORY...\XYZ_SITE_FILE CHOICE-ITEM (NOT SHOWN) OF A NOW-SHRUNKEN SPREADSHEET WINDOW (633)ONTO THE OPEN DESKTOP AND THE CONVERSION OF THE RIGHT-DRAGGED CHOICE ITEM INTO EXECUTABLE OBJECT 689, WHERE CLICKING ON 689 LAUNCHES THE SPREADSHEET PROGRAM AND OPENS A JUST-SAVED DISK FILE (SAVED BY USING 679b) FOR FURTHER PROCESSING BY THE SPREADSHEET PROGRAM |
| 679a | THIS IS THE EXECUTABLE, XYZ_SITE_VISIT OBJECT THAT WAS CREATED BY OPERATION 654 FROM THE 'FAVORITES' OR 'BOOKMARKS' CHOICE-LISTING MENU 677 |
| 679b | THIS IS THE EXECUTABLE, SAVE_VISIT_AS OBJECT THAT WAS CREATED BY OPERATION 655 FROM THE 'FILE' CHOICE-LISTING MENU 676 |
| 689 | THIS IS THE EXECUTABLE OBJECT THAT WAS CREATED BY OPERATION 684 WHERE A FILE-HISTORY CHOICE-ITEM (NOT SHOWN) WAS RIGHT DRAGGED FROM A SPREADSHEET WINDOW (NOW MINIMIZED INTO 633) AND DROPPED AT THE LOCATION OF SHOWN OBJECT 689. THE DROPPED OBJECT WAS THEN RE-TITLED AS PROCESS XYZ_SITE_FILE |
| 690 | THIS ICON REPRESENTS AN E-MAILING PROGRAM. IF A DRAG-AND-DROP OBJECT IS DROPPED ONTO ICON 690, THAT CAUSES THE E-MAILING PROGRAM TO START UP AND TO AUTOMATICALLY GENERATE A NEW E-MAIL LETTER CONTAINING THE CONTENTS (TEXT OR OTHER) OF THE DATA FILE (E.G., MY_FILE4) ASSOCIATED WITH THE DROPPED FILE OBJECT (E.G., 619a) |
| 691 | THIS SINGLE DASHED LINE REPRESENTS A CONTINUED RIGHT-DRAGGING OF A HISTORICAL FILE-NAME CHOICE-ITEM FROM HISTORY SUBMENU 616 AND THE DROPPING OF THE RESULTING OBJECT (E.G., 619a) ONTO A RECEIVING SECOND OBJECT (E-MAILING PROGRAM 690) |
| 692 | THIS SINGLE DASHED LINE REPRESENTS A RIGHT-DRAGGING (OR OTHERWISE CONVERTING) OF A 'FAVORITES' OR A LIKE CHOICE-ITEM OUT OF THE E-MAIL PROGRAM (690, AFTER IT WAS LAUNCHED BY ACTION 691) AND THE DROPPING OF THE DRAGGED CHOICE ITEM ONTO THE OPEN DESKTOP SO AS TO CREATE A 'FAVORITE ADDRESSEE' OBJECT 694. AN OBJECT LIKE MY_FILE4 (619a) CAN BE DRAGGED AND DROPPED ONTO THE FAVORITE ADDRESSEE OBJECT 694. IF SO, THE CONTENTS OF THE CORRESPONDING FILE (E.G., MY_FILE4) ARE AUTOMATICALLY COPIED INTO OR ATTACHED TO AN E-MAIL LETTER AND THE LETTER IS AUTOMATICALLY SENT TO THE 'FAVORITE ADDRESSEE' (E.G., TO_BILL). |

FIG. 6B

SYSTEM AND METHOD FOR PRODUCING A DRAG-AND-DROP OBJECT FROM A POPUP MENU ITEM

BACKGROUND

1. Field of the Invention

The invention is generally directed to graphical user interfaces (GUI's) on computer systems. The invention is more specifically directed to a subclassing method that enables users to convert an on-screen listed item of a popup menu into a drag-and-drop object.

2. Description of the Related Art

Graphical user interfaces (GUI's) have found wide spread acceptance among computer users. Instead of having to remember a list of arcane command names, users can now intuitively click on (e.g., with the aid of a mouse button), or otherwise activate, graphical areas on the screen and thereby open previously-hidden lists of next-action choices. A further click or other activation on a selected one of the choice-items initiates a pre-programmed function associated with the chosen item.

Such menu-driven choice-making usually takes the form of the well-known popup menu, or scrolldown menu, or context menu. Any one or more of these choice-supplying mechanisms or their like is referred to herein as a 'choice-listing menu'.

To invoke a choice-listing menu (e.g., a scrolldown menu), the user typically moves an on-screen cursor or another pointing indicia over part of a menu-dropping bar or over another such menu producing area. The user then clicks on a mouse button to initiate the unscrolling or other presentation and/or activation of the choice-listing menu (e.g., a scroll-down menu). Of course, means other than mouse clicking may be used for initiating the presentation and/or activation of a choice-listing menu. For example the user may instead press a predefined combination of 'hot' keys on the keyboard to cause a desired menu to emerge onto the screen.

As its name implies, the choice-listing menu displays a set of choice-items to the user. The user is expected to select one of these choice-items. The represented function, if selected and activated, is thereafter executed.

One or more of the displayed choice-items in a first choice-listing menu can be a source area that unfurls yet another choice-listing menu from the first menu. The unfurled second menu can itself have further submenus.

Most users of the Microsoft Windows 3.1™ or Microsoft Windows95™ operating systems are familiar with the common menu-dropping bar that appears at the top of an active window that is opened under the Win16 or Win32 system kernel. The window's top bar (menu bar) typically contains areas marked as, FILE, EDIT, VIEW, HELP and so forth. If the user clicks on the FILE area, a scrolldown menu comes down from that area to present FILE-related choice-items such as OPEN, SAVE, SAVE AS, RENAME, CLOSE, EXIT. Selecting the OPEN choice-item implies that an OPEN FILE function will be performed and a to-be-designated file will be opened. Selecting the SAVE choice-item implies that a SAVE FILE function will be performed and a designated file (usually the currently open file) will be saved. Selecting the SAVE AS choice-item implies that a SAVE FILE AS_new_name function will be performed and a designated file (usually the currently open file) will be saved under a new name. The remaining FILE-related choice-items provided further file-related functions in accordance with their respective names.

If the user clicks on the EDIT area, a different scrolldown menu comes down from that area to present EDIT-related choice-items such as UNDO, COPY, CUT, PASTE, and so forth. The COPY function for example copies selected data to a clipboard area that is shared by application programs.

Once one of the presented choice-items is selected and invoked from an activated choice-listing menu, a corresponding, pre-programmed function is executed (such as OPEN FILE, SAVE FILE, COPY, etc.). A menu-invoked function can include the unfurling of a further menu that has further choice-items.

For each of the presented choice-items in a given menu, the user is given only the following choices: either select one of the choice-items in the displayed menu or do not select any item and instead close (rescroll) the choice-listing menu.

It may be advantageous to enable users to perform additional functions with the choice-items of choice-listing menus other than to either select one of the presented choice-items or not select any choice-item.

SUMMARY OF THE INVENTION

In accordance with the invention, users are empowered to generate one or more drag-and-drop objects from a corresponding one or more choice-items within a presented choice-listing menu. The thus-generated objects may be dragged away from their points of creation and dropped into new areas of the screen. At the point of drop, each so-generated and dragged item acquires a new functionality, generally one other than being a choice-item in a choice-listing menu.

In one embodiment of the invention, the choice-items within a choice-listing menu include one or more historical file names identifying data files recently worked on from within the corresponding application program. Each such historical file name, as listed in the application's choice-listing menu, may be converted into a draggable object (with or without deletion of the original choice-item). The draggable object may then be dragged away from its point of origin and dropped onto another screen area. The dropped item then becomes a separately-activatable object within the screen area where it was dropped. This separately-activatable object typically takes the form of a newly-created icon which may be used, for example, as a 'shortcut' for automatically launching an associated application program and simultaneously opening the named historical data file from within that application program. The user is thus given an intuitive and convenient way of creating shortcuts to routinely worked-on files and routinely-used file processing, application programs.

In order to uniformly provide each application program with this same ability to convert a choice-item from a displayed choice-listing menu into a drag-and-drop object, an application program subclassing trick is used. At the time each application program is launched, a popup menu monitoring subroutine is attached (subclassed on) to that application program. The popup menu monitoring subroutine is activated each time an event is detected where the event may involve use of a choice-listing menu within the subclassed application program.

If a predefined 'hot' sequence of user-input events is carried out, such as a special keying composed of clicking on the right mouse button and simultaneously dragging, the popup menu monitoring subroutine temporarily takes over control to create a drag-and-drop object from the choice-item that had been last selected and then hot keyed on (specially keyed on). At the time of selection, the popup menu monitoring subroutine saves the object specifications of the selected choice-item. At the time of hot keying, the popup menu monitoring subroutine closes the currently unfurled choice-listing menu and any additional further menus in the active window. The closing of the currently unfurled one or more choice-listing menus allows another choice-listing menu to be unfurled during a subsequent drag-and-drop object operation without conflicting with the first unfurled choice-listing menu or menus.

After closing the first unfurled choice-listing menu(s), the popup menu monitoring subroutine instructs the operating system to create a drag-and-drop object using the last saved object specifications of the last selected choice-item.

At the time of drop, the area receiving the dragged-and-dropped object completes the assignment of properties to the dragged-and-dropped object based on the source specifications and further based on the target location into which the dragged-and-dropped object has been dropped.

Other aspects of the invention will become apparent from the below detailed description.

BRIEF DESCRIPTION OF THE DRAWINGS

The below detailed description makes reference to the accompanying drawings, in which:

FIGS. 2A, 3A, 6A–B provide legend information.

DETAILED DESCRIPTION

Figure 1:
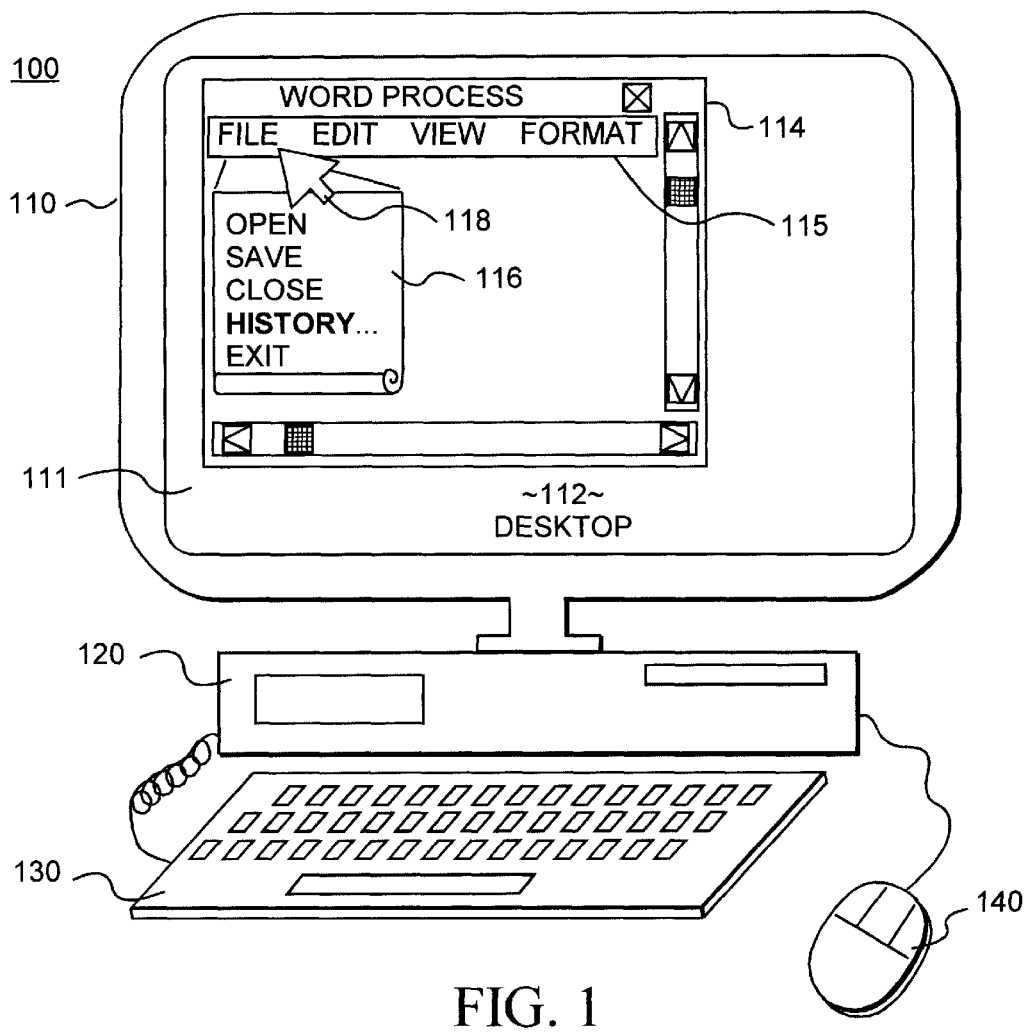
FIG. 1 is a perspective view of a computer system in accordance with the invention.

FIG. 1 illustrates a perspective view of an overall computer system 100 in accordance with the invention. The computer system includes a display monitor 110, a computer housing 120, a keyboard 130 and a mouse 140. The illustrated user input and output devices 110, 130 and 140 are merely by way of example. Other visual output devices and user input devices may, of course, be used in addition to or in place of the illustrated devices. Mouse 140 for example can be replaced by or supplemented with other graphically-oriented user input devices such as trackballs, touch pads, joysticks, and so forth.

Display monitor 110 includes a display screen 111 that displays a number of graphical items including a desktop layer 112 and an overlying, opened application window 114. In this particular example the opened application window 114 contains a running word processing program having the fictional name, WORD PROCESS. The actual word processing program could be Microsoft WORD™, or Corel WordPerfect™, or Lotus Ami Pro™, or any one of a host of other commercially available word processing programs. The application window 114 could alternatively have contained a spreadsheet program (e.g., Microsoft EXCEL™), a picture-drawing program (e.g., Adobe Illustrator™), an Internet browser program (e.g., Microsoft Explorer™), an electronic mailing program (e.g., Qualcomm Eudora™) or any other such application program.

Application window 114 is shown to contain a top menu bar 115 having menu-dropping areas such as FILE, EDIT, VIEW, FORMAT, etc. A user-movable cursor 118 is displayed on screen 111 in the form of an arrowhead and made movable over the other displayed items in response to user activation of the mouse 140 or of another such input device. The arrowhead shaped cursor 118 is shown in FIG. 1 to have been brought over the FILE portion of the top menu bar 115. The left mouse button has been clicked and this caused a pop-down menu 116 to unscroll from the activated FILE region.

The unscrolled pop-down menu 116 lists a number of options that may be performed by the application program with respect to the FILE category. These exemplary options include: OPEN (to open an otherwise identified file), SAVE (to save an identified file), CLOSE (to close an identified file that has been previously opened), and HISTORY . . . , where the latter choice-item unfurls a second menu (not shown in FIG. 1, but see FIG. 3) that names a set of previously worked-on files. The named historical files may be reopened from within the running application by clicking on one of their names after unfurling the FILE HISTORY . . . submenu (317 of FIG. 3). The FILE EXIT choice-item of pop-down menu 116 (FIG. 1) may be clicked on when the user wishes to exit the application program (e.g., WORD PROCESS) and close all related files.

As understood by users of GUI's, the cursor 118 moves in coordination with movements of the mouse 140 or in coordination with movements of another appropriate user input device such as a trackball or a joystick. Cursor 118 may be brought down along the choice-items of pop-down menu 116 for selecting a specific one of the listed choice-items.

In the past, a user was generally limited to selecting and invoking one of the choice-items listed on the pop-down menu or not selecting any choice-item and instead closing the menu 116 (e.g., by hitting the ESC key). The present invention provides additional options.

As will be detailed below, one or more of the menu choice-items may be copied or torn-away as a draggable object and dropped into a new location where the dragged-and-dropped object takes on new functionality.

This means that application program functions that were previously accessed by opening the application program, and thereafter navigating through a series of menus and submenus, can now be converted into more permanently visible, object icons or tool icons that can be accessed and invoked more easily than before.

A variety of new desktop functions can be created by the user as desired.

As a first example, assume there is a particular 'local' data file that the user routinely keeps on a local hard disk of his or her machine. Assume the user routinely uses that local data file from within a particular application (e.g., WORD_PROCESS or SPREADSHEET). The local data file may have a long pathname such as, C:\user\me\wordproc\projectX\MY_FILE.123 which the user does not want to type out in full each time. To avoid such lengthy typing, the user can instead (1) launch the WORD PROCESS application program, (2) point to and unfurl the FILE menu, (3) select and unfurl the HISTORY . . . submenu, and then finally (4) select and activate the MY_FILE.123 choice-item (assuming it is still listed as part of the HISTORY . . . and has not been replaced by names of more-recently worked on files). But even this is a somewhat convoluted process.

In accordance with the invention, the user unfurls the HISTORY . . . submenu once, points to the desired MY_FILE.123 choice-item (a historical data filename) and then right depresses with the mouse, drags on the selected choice-item and drops it on an open desktop area. The dragged-on choice-item is automatically converted into a desktop 'shortcut' object that remains on the desktop after being dropped there even after the application program (e.g., WORD PROCESS) is closed and exited from. A later double-clicking on the created 'shortcut' icon automatically re-launches the application program (e.g., WORD PROCESS) and thereafter automatically opens the corresponding local data file (C:\ . . . \MY_FILE.123).

As a second example, suppose there is a particular 'external' download file that can be, and periodically is changed by other users. Suppose the local user has a Notification Program that, when invoked, compares the latest version indicators of the 'external' download file against those of a local copy that has been previously downloaded by the local user. If the version indicators are different, the Notification Program fetches the latest version from over the Internet or from over some other network (e.g., a company Intra-net) and locally substitutes the fetched file in place of the earlier version local file. An example of such a Notification Program is Norton Notify™ available from Symantec Corp. of California.

Suppose that the downloaded latest-version file is to be used by the local user with a particular application program. One possibility is that the 'external' download file contains constantly changing financial information and the application program is a spreadsheet or like program that analyzes the most recent information. The difference here relative to the first given example is that the downloaded file changes quickly at its source site and the user wants to each time download the most recent version of that quickly changing file.

In accordance with the invention, the 'net_favorites' or 'net_bookmarks' or other such FileName representations of the downloaded file, as it appears in a choice-listing menu of the application program, is converted into a dragged-and-dropped desktop icon. The "Properties" of the dragged icon is modified to automatically invoke the Notification Program while the parameter passed to the Notification Program is the associated FileName of the so-generated icon itself. When the so-generated, 'net_favorite' icon is thereafter double-clicked on, the open-file action automatically launches the Notification Program, which then automatically obtains the latest version of the desired external file either locally if available or from over the network if the latest version has changed.

As an extension to the second example, the user may further, for convenience's sake, create a second desktop object by tearing away a FILE_Open or a FILE_History menu choice-item from the application program (e.g., spreadsheet program) that is to next use the latest-version obtained by the Notification Program. When this second desktop object is double-clicked on, it will automatically pick up the latest-version file and open it under an automatically launched application program (e.g., the spreadsheet program).

For even more automation, one can tuck into a Windows Start_Up folder in the recited order, both of the executable objects, namely, (a) the Notification Program launching object; and (b) the menu-torn-from object which OPENS the named-file after launching the associated application program (e.g., SPREADSHEET or WORD_PROCESS). These executable objects may then be automatically executed in the recited order when the user's desktop starts up and begins executing the executable objects within the Start_Up folder. When start_up completes, the user will find him/herself looking at the last opened application program (e.g., SPREADSHEET or WORD_PROCESS) with the latest version of the desired Internet (or other network based) file having been fetched, saved locally, and opened.

As a third example of how the choice-item drag-and-convert-to-object feature of the invention can be used, assume there is a particular Internet or Intranet web site that is a routinely-visited favorite of the user. The name of that Internet/Intranet 'favorite' web site can be torn out from a 'favorites' or 'bookmarks' or like visit-history recording menu within the browser program and converted into a browser launching icon that automatically seeks out that 'favorites' web site (e.g., a favorite search engine site).

By way of yet a fourth example of how the choice-item drag-and-convert-to-object feature of the invention can be used, assume there is a particular e-mail addressee to whom the user routinely sends electronic mail (via the Internet or over another network). The name of that favorite e-mail addressee can be torn out from an 'aliases' menu in the electronic-mail program and converted into an e-mail launching icon that automatically fills in the e-mail 'To' address field after launching the e-mailing program and invoking the send e-mail function.

Figure 2:
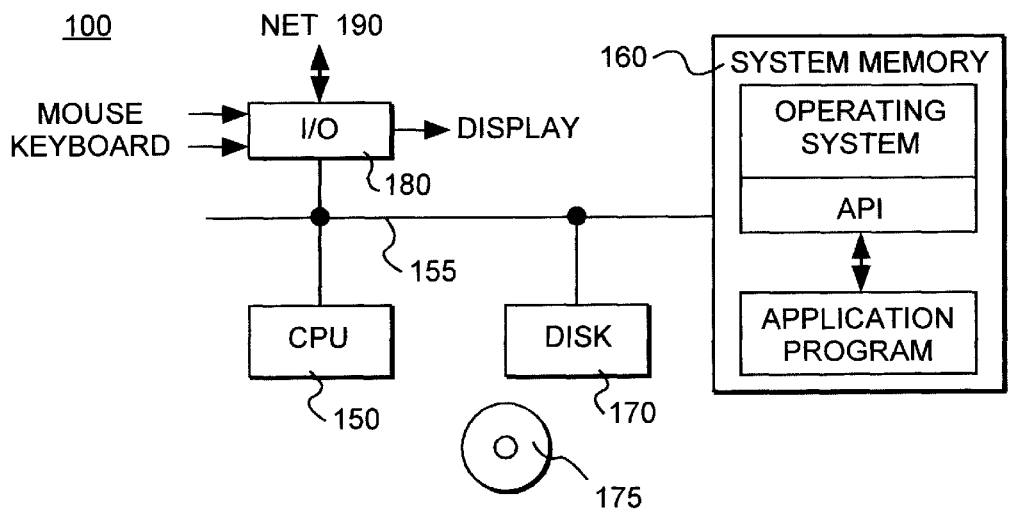
FIG. 2 is a block diagram of interconnected components within a computer system in accordance with the invention.

Before delving into all these and further options, a few system basics are reviewed. Referring to FIG. 2, interconnected components of computer 100 are shown schematically. Computer 100 includes a central processing unit (CPU) 150 or other data processing means, and a system memory 160 for storing immediately-executable instructions and immediately-accessible data for the CPU 150. System memory 160 typically takes the form of DRAM (dynamic random access memory) and cache SRAM (static random access memory). Other forms of such high-speed memory may also be used. A system bus 155 operatively interconnects the CPU 150 and system memory 160.

Computer system 100 may further include nonvolatile mass storage means 170 such as a hard disk drive, a floppy drive, a CD-ROM drive, a re-writable optical drive, or the like that is operatively coupled to the system bus 155 for transferring instructions and/or data over bus 155. Instructions for execution by the CPU 150 may be introduced into system 100 by way of computer-readable media 175 such as a floppy diskette or a CD-ROM optical platter or other like, instructing devices adapted for operatively instructing the CPU 150 (or an equivalent instructable machine). The computer-readable media 175 may define a device for coupling to, and causing system 100 to perform operations in accordance with the present invention as further described herein.

System 100 may further include input/output (I/O) means 180 for providing interfacing between system bus 155 and peripheral devices such as display 110, keyboard 130 and mouse 140. The I/O means 180 may further provide interfacing to a communications network 190 such as an Ethernet network, a SCSI network, a telephone network, a cable system, or the like. Instructions for execution by the CPU 150 may be introduced into system 100 by way of data transferred over communications network 190. Communications network 190 may therefore define a means for coupling to, and causing system 100 to perform operations in accordance with the present invention.

System memory 160 holds executing portions of the operating system (OS) and of any then-executing parts of application programs. The application programs generally communicate with the operating system by way of an API (application program interface). System memory 160 may include memory means for causing system 100 to perform various operations in accordance with the present invention.

With GUI-type operating systems (OS's) such as Microsoft Windows 3.1™ or Microsoft Windows95™, or Microsoft Windows NT™ 4.0 the OS often temporarily stores data object specifications of executable or other software objects that are currently 'open' and immediately executable or otherwise accessible to the CPU 150. Although not specifically shown in FIG. 2, parts of system memory 160 can be dynamically allocated for storing the data object specifications of open objects. The so-allocated memory space may be de-allocated when the corresponding object closes. The de-allocated memory space can then be overwritten with new information as demanded by system operations and actions of third party application programs.

For 'desktop' objects, the corresponding data object specifications typically include the following: (1) a full pathname pointer to the object so that the object can be fetched and executed; (2) information about associated application programs, (3) information about the size, shape and location of the on-screen icon that represents the object, and (4) information about various user-set preferences that control user-programmable properties of the object. The corresponding data object specifications can of course include additional or alternative items of information of like nature. Transfer of objects and specifications between application programs is typically handled in accordance with an inter-application protocol such as Microsoft OLE (Object Linking And Embedding) or DDE (Dynamic Data Exchange).

Figure 3:
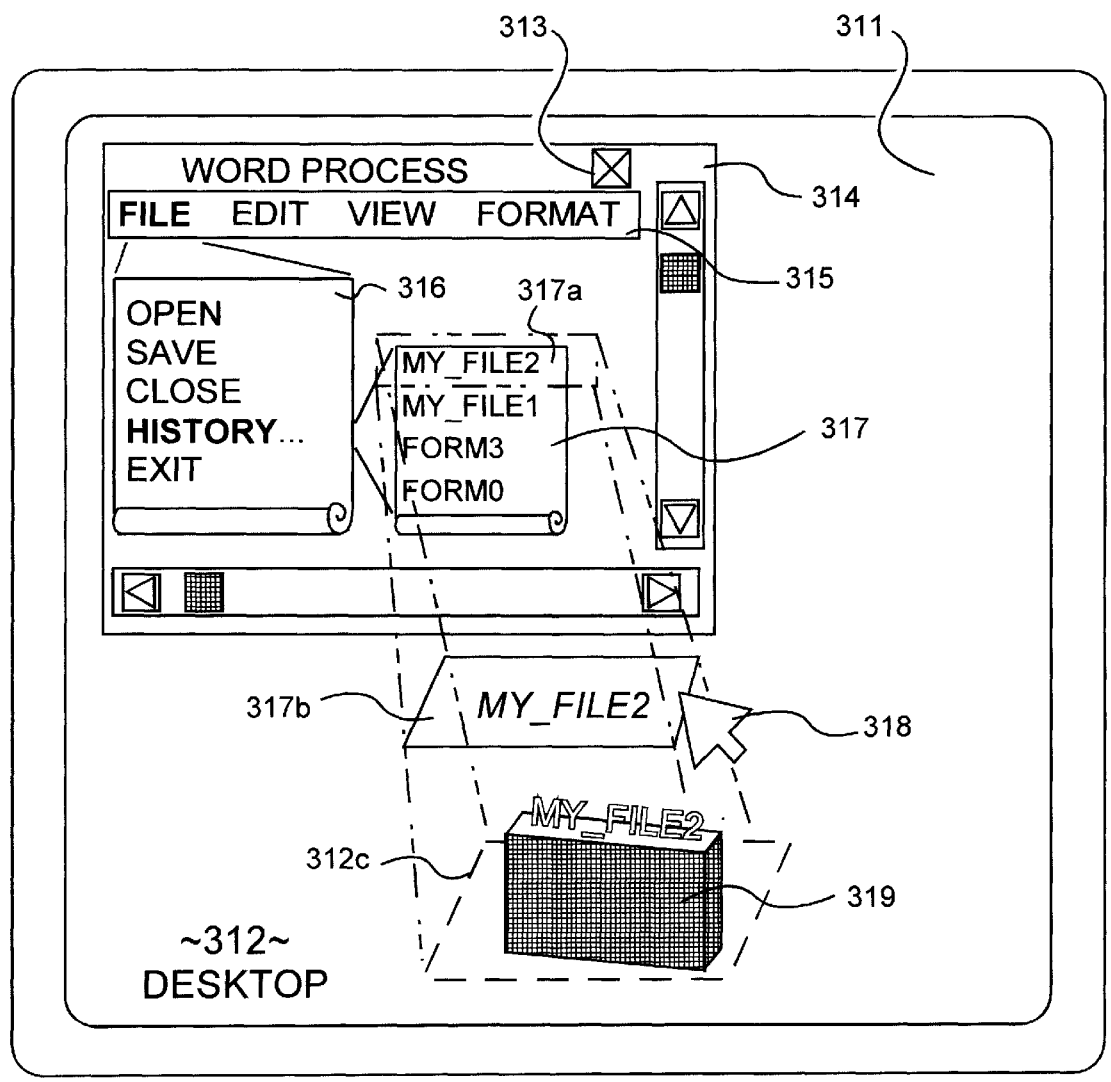
FIG. 3 illustrates a drag-and-drop operation in accordance with the invention.

Referring to FIG. 3, a simple choice-item drag-and-convert-to-object operation in accordance with the invention is now described in more detail. Region 311 is a screen area containing the graphical metaphor for a desktop 312. Within desktop 312, one or more application windows such as 314 may be opened. In this example, the opened window is running a word processing program (WORD PROCESS). It could just as easily have been a spreadsheet or a net-browser.

A first scroll-down menu 316 has been unfurled from the FILE region of the window's menu bar 315. Window 314 includes an Exit-button (X in a square) 313 that may be clicked to quickly close the window and exit the application program.

In the example of FIG. 3, the user has pointed to and has mouse-wise left-clicked on the HISTORY . . . side menu to reveal a historical listing 317 of names of files recently worked on. The user has then moved the cursor (318, shown in a later position of the operation) to select (e.g., highlight) the MY_FILE2 choice-item 317a. Thereafter the user has right-clicked on the MY_FILE2 choice-item 317a and dragged a generated copy 317b of that choice-item across the screen toward region 312c. Cursor 318 is shown in the state where the cursor is riding along with the now being-dragged object 317b.

The user will continue to depress the right mouse button and drag icon 317b until it comes into a user-chosen, empty desktop region 312c. At that point, the user releases the right mouse button and thereby drops the dragged object 317b over new region 312c.

The dropped item 317b is then converted by the receiving desktop area 312c into a new user-activatable object 319. The properties of the new object 319 are initially established by the inter-application object-transfer protocol then in force for drag-and-drop operations. The inter-application object-transfer protocol can be the Microsoft OLE standard or DDE or any other such protocol. In most instances, the user can modify a "preferences" portion within the properties of the new object 319 after it has been dropped into position. The new object 319 may be represented by a graphical icon or other indicia as appropriate. In the illustrated example, the new object 319 is represented by a 3-dimensional appearing, word-processor launching icon having the title MY_FILE2 as shown in screen region 312c. A user can revise the title portion of object 319 to whatever title is desired using the rename facilities of the operating system.

After object 319 is created from the corresponding choice-item (e.g., MY_FILE2) and is optionally renamed, the user may double-click on the new object 319 or otherwise activate it. At that point in time, a version of the same application program (WORD PROCESS) will be launched and the file named MY_FILE2 will be automatically opened from within the launched application. In this way, the user is provided with a shortcut to opening the desired file within the desired application program. The user avoids having to separately open the application program and then traverse through a series of menus 316 and submenus 317 to reach the desired goal state.

Figure 4A:
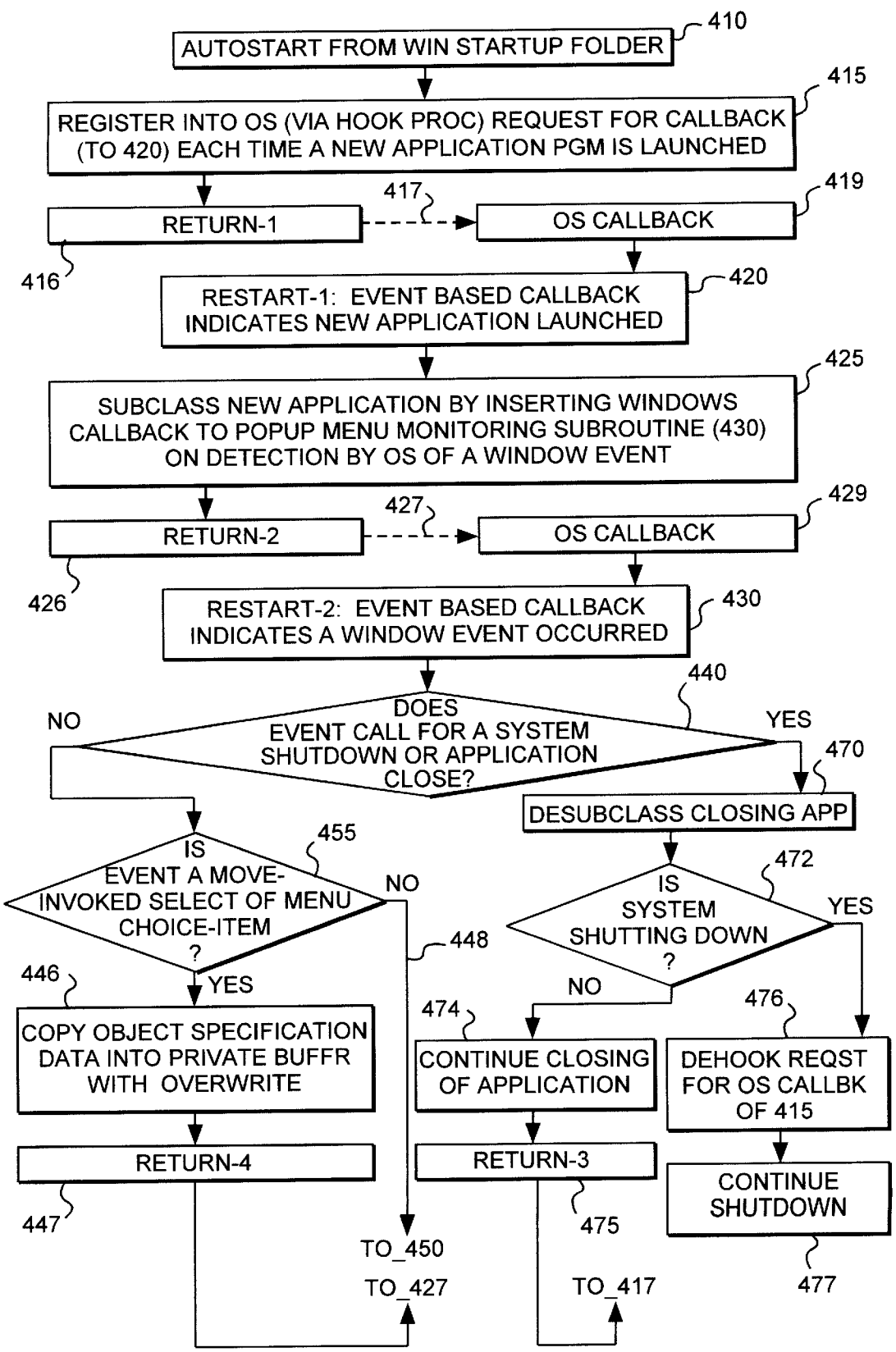
FIGS. 4A and 4B provide a flow chart of a method for creating draggable objects from choice-items of choice-listing menus of various application programs.
Figure 4B:
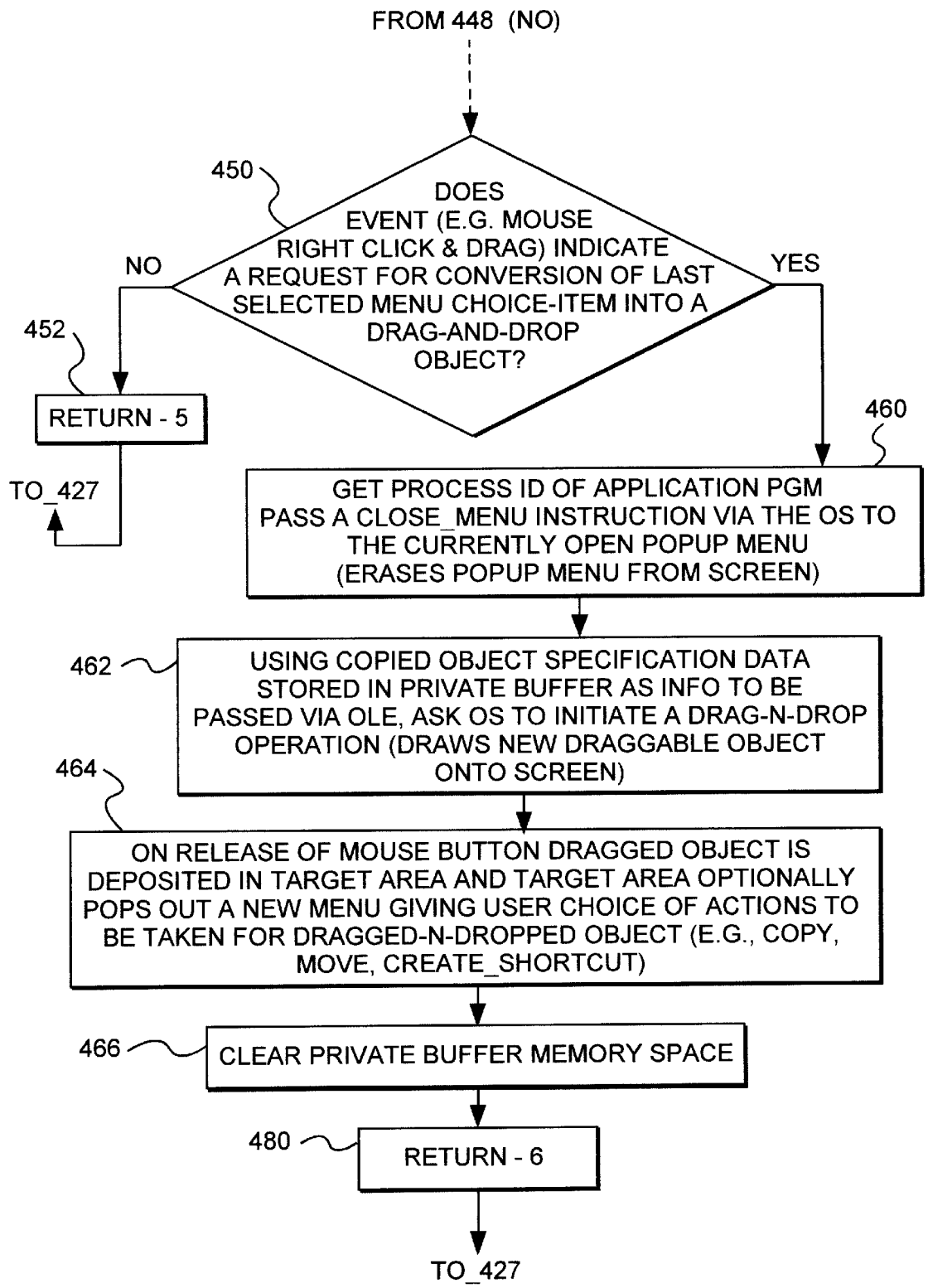

FIGS. 4A and 4B show a flow chart for a method 400 in accordance with the invention for converting menu choice-items into drag-and-drop objects.

At step 410 a choice-item converting program 400 in accordance with the invention is automatically launched along with other system-invoked processes during start up of the computer 100. The automatic launching can be realized for example by including a pointer to the choice-item converting program 400 in a Windows Start_Up folder that is used during start up by Microsoft Windows 3.1™ or Microsoft Windows95™ or Microsoft Windows NT™ 4.0 or a like windows-based operating system. Program 400 can also be initiated by the user rather automatically by system start up.

At first entry step 415, the choice-item converting program 400 registers a request for an OS call back to a second entry point 420 each time the OS receives a broadcast message indicating that a new application program has been launched. The request registration of step 415 may be carried out with an events hooking procedure. Events hooking within GUI environments such as the Windows 3.1™ and Windows95™ environment is a procedure well known to those skilled in the art and will therefore not be detailed here. Reference is made to the Microsoft application development guidelines and to the various works of Matt Pietrek such as 'Windows95 System Programming Secrets', IDG Books, regarding such event hooking procedures.

After step 415, the choice-item converting program 400 makes a first return (RETURN-1) as indicated at 416 and returns control to the operating system (OS).

Dashed line 417 represents a time period during which the operating system (OS) or other programs are in control.

At an event-driven time point 419, the OS transfers control back to re-entry point 420 of the choice-item converting program 400. This happens because a 'new application launched' event report has been received by the OS and the OS has executed the call back as requested at step 415.

At step 425 a 'procedure subclassing' operation is performed to attach a popup menu monitoring subroutine (having entry point 430) to the newly launched application program. Such 'procedure subclassing' is known to those skilled in the art and will therefore not be detailed here. Reference is made to the Microsoft application development guidelines and to the various works of Matt Pietrek such as 'Windows95 System Programming Secrets', IDG Books, regarding such procedure subclassing operations.

The subclassing operation 425 in essence registers a further request for an OS call back to a third entry point 430 each time the OS receives a broadcast message indicating that a windows event has occurred involving the subclassed application program. Such windows events include a wide variety of activities within the subject window (e.g., window 314 of FIG. 3) such as: a mouse-move within the area of the window (314), a mouse-button click within the area of the window, the opening of a menu-type subwindow (316) within the area of the window, a request for closing of the window and exiting from the running application (e.g., because Window Exit button 313 has been clicked on), and so forth.

After step 425, the choice-item converting program 400 makes a second return (RETURN-2) as indicated at 426 and relinquishes control back to the operating system (OS). Dashed line 427 represents a time period during which the operating system (OS) or other programs are in control.

At an event-driven time point 429, the OS returns control to re-entry point 430 of the choice-item converting program 400. This happens because a windows event has been detected for the window in which the subclassed application program is running. Many of the possible window events are of no interest to the popup menu monitoring subroutine (which subroutine has entry point 430) and control is quickly returned to the OS if this is found to be so.

One window event that is of interest to the popup menu monitoring subroutine is an event that calls for either a closing of the subclassed application program or a shutdown of the operating system (OS). One possibility is that the user has clicked on a FILE EXIT choice-item and has thereby requested a complete closing of the application program. Another possibility is that the user has clicked on the Window Exit button 313. Yet another possibility is that a system error has occurred and the error handling software has invoked a system shutdown.

At step 440, a first test is conducted to determine if the callback-invoking event indicates that the subclassed application program of that window is closing or that the OS is shutting down. If the answer is Yes, control passes to step 470.

In step 470, the closing application program is returned to a nonsubclassed state. This allows the application program to later relaunch cleanly even if for some reason the choice-item converting program 400 is not invoked prior to the launch.

In a following step 472 a test is made as to whether the event is merely an exit from the application program (because of either a user request or because of some other reason) or whether the event is to continue with a system shutdown (again either because of a user request or because of some other reason).

If the system is not shutting down (and the response to test 472 is No), control passes to step 474 where the application is allowed to complete its normal closing. A return (RETURN-4) is made at step 475 to return control back to the OS. Step 475 is shown returning control to wait-state 417. The choice-item converting program 400 will restart at step 420 the next time a new application program is launched.

If the system is shutting down (and the response is Yes to test 472), control passes to step 476 where the hook request of step 415 is undone. At step 477, the shutdown of the system is allowed to continue. The choice-item converting program 400 terminates and does not restart until step 410 is again entered at some future time, such as when the system is brought back up. Automatic re-start of the choice-item converting program 400 may not occur if changes are made to the Start_Up folder that remove it from the automatic start up list.

Besides program closing and system shutdown, another of the window events that is of interest to the popup menu monitoring subroutine is an event that causes 'selection' of a next choice-item in a choice-listing menu. Selection is not the same as invocation of a menu choice-item. Selection generally occurs before invocation. Typically the user is moving the mouse arrow (118) down a choice-listing menu, highlighting each successive choice-item in sequence. The highlighting constitutes a selection but a mouse button has not yet been clicked to invoke the choice-item. Selection of a choice-item can also be carried out with the cursor movement keys of the keyboard.

At the time of choice-item selection, the OS generates and/or points to a data buffer containing the object specifications of the selected choice-item. The object specifications can be Owner_Drawn, meaning that the running application program has generated them, or the object specifications can be system generated, meaning that the OS has generated them. In either case the full object specifications are available at the time of choice-item selection. They may not always be available at other times. For example, a third party application program may arbitrarily choose at a later time to move or erase the object specifications.

Given this, if in step 445 the popup menu monitoring subroutine determines that the event was a move-invoked selection of a next choice-item, the popup menu monitoring subroutine (430) identifies and makes a full copy for itself of the object specifications of the selected choice-item at step 446 each time such a new selection is made. The copied object specifications are placed into a private memory buffer of the popup menu monitoring subroutine. If memory space has not been allocated previously for this buffer, it is so allocated (statically or persistently) the first time the popup menu monitoring subroutine 430 executes step 446. Thereafter with each subsequent selection of a choice-item, the object specifications of the selected item overwrite the object specifications of a previously selected choice-item. This is done so that, application-drawn object specifications are assuredly preserved even if a third party application program arbitrarily chooses at a later time to move or erase the object specifications.

After step 446, a return (RETURN-4) is executed at step 447 to return control back to the OS. Step 447 is shown returning control to wait-state 427.

If the next window event is another choice-item selection, step 446 will be performed again to capture the full object specifications of the latest selected choice-item.

If the next window event is an invocation by a left mouse click on the selected choice-item, control passes from step 429, through the 'No' outgoing path of step 440, through the 'No' outgoing path 448 of step 445, and through the 'No' outgoing path of next-described step 450 (FIG. 4B), to quickly exit (RETURN-5 back to OS) at step 452. The OS then handles the left-click invocation of the selected choice-item (e.g., FILE SAVE or FILE CLOSE) in the usual manner.

If however, the next window event indicates completion of a 'hot' user input (special keying) such as a mouse right-button depress followed by a begin of drag, control passes from step 429, through the 'No' outgoing path of step 440, and through the 'No' outgoing path 448 of step 445 to the hot input detecting test of step 450. A Yes answer to the hot input detecting test of step 450 is taken as user request for conversion of the last selected choice-item into a drag-and-drop object.

At subsequently executed step 460, the process ID of the application program is initially obtained and stored. This is done to support a later-described step 550 of one embodiment wherein the process ID is used. Next, the handle of the currently-open choice-listing menu is located and the OS is instructed to close that menu and to close all higher level choice-listing menus from which the first menu springs. In the case of FIG. 3 for example, submenu 317 would close and be erased from the screen and then higher level menu 316 would close and roll back up into its FILE source area in menu bar 315. A method for locating the Windows handle of the currently-open, lowest level, choice-listing menu is described below with reference to FIG. 5.

At following step 462, after the popup menus have closed, a drag-and-drop object such as shown at 317*b* of FIG. 3 is created. This is done by passing to the operating system (OS) the object specifications of the last selected choice-item as they were saved in the private buffer of the popup menu monitoring subroutine (430) during the last pass through step 446. The operating system (OS) is asked to begin a drag-and-drop operation using the passed object specifications. In FIG. 3, this step results in the on-screen drawing of a drag-and-drop object such as shown at 317*b*. The actual size and shape of the drawn object 317*b* will vary in accordance with the passed object specifications and how the OS responds to them.

The user will continue to drag the generated object (e.g., 317*b*) until it reaches a user-chosen drop area, such as open desktop area 312*c* of FIG. 3. The user then releases the mouse button and thereby drops the dragged object onto the receiving area (e.g., 312*c*). The dropping of the drag-and-drop object 317*b* is indicated by step 464 of FIG. 4B.

In step 464, the receiving area (or target area, e.g. 312*c*) can respond to the drop operation in a variety of ways. One way is by changing the appearance of the dropped object. This possibility is indicated in FIG. 3 by the difference in appearance between the in-drag object 317*b* and the ultimately dropped object 319. Transfer of object specifications from the dragged object (e.g., 317*b*) to the receiving area (e.g., 312*c*) can be by way of OLE's Uniform Data Transfer protocol (UTD) or by way of like transfer protocols of then in-use inter-application communication processes (e.g. DDE).

When the dragging completes, the target area (e.g. 312*c*) may optionally respond to the dropping of the dragged object 317*b* by presenting a new choice-listing menu to the user. This action is not shown in FIG. 3. However step 464 of FIG. 4B shows that the typical choice-listing menu at this stage will have choice-items such as COPY, MOVE, and CREATE_SHORTCUT. The user selects and invokes one of these choice-items and the target area (e.g. 312*c*) responds accordingly. One important thing to note is that if step 460 (closing of the original menus) had not been previously carried out, there would be a conflict of open menus on the screen and the drag-and-drop operation of step 462 would fail in cases where the target area (e.g. 312*c*) tries to open its own choice-listing menu (e.g., COPY, MOVE, CREATE_SHORTCUT). Step 460 assures that the drag-and-drop operation will complete without conflict between multiple open menus.

User selection of the COPY choice-item at the target area will generally result in leaving the source choice-item data intact in memory and creating a copy of the data in memory as a separate entity. User selection of the MOVE choice-item at the target area will generally result in deletion of the source choice-item data and in the creating of the 'moved' version as a substitute entity having a new address. User selection of the CREATE_SHORTCUT choice-item at the target area will generally result in leaving the source choice-item data intact and in the creating of a dropped object (e.g., 319) as a separate entity that automatically launches the associated application program when double-clicked on.

The above examples are not intended to limit the actions of the target area (e.g. 312*c*) in response to the dropping of the dragged object (e.g., 317*b*). Properties of the dropped object (e.g., 319) can vary in accordance with the specific source menu, the application program that produces the source menu, the specific choice-item (317*a*) that serves as the source of the drag-and-drop object (317*b*), the specific target area that receives the dragged-and-dropped object, the inter-application drag-and-drop transfer-protocol being used, and various user-set preferences. The target area that receives the dragged-and-dropped object can be an open desktop area or a second GUI object or a shortcut window associated with any particular application that supports the inter-application drag-and-drop transfer-protocol (e.g., OLE or DDE).

At step 466, the private buffer memory space that stored the object specifications for the drag-and-drop operation is cleared and thereby made ready for re-use with next-occurring menu selections.

After step 466, a return (RETURN-6) is executed at step 480 to return control back to the OS. Step 480 is shown returning control to wait-state 427. If a subsequent window event is another choice-item selection, step 446 will be performed again to capture the full object specifications of the latest selected choice-item. If a following window event is a hot user input such as dragging with the right mouse button depressed, steps 450, 460 through 480 will be performed again to generate another dragged-and-dropped object. Any desired and practical number of conversions of choice-items into dragged-and-dropped objects may be carried out using either a same source window or different source windows, as desired.

After a dragged-and-dropped object is created in accordance with the invention from a choice-item, that object can be later deleted if desired in the same manner that other desktop objects can be deleted. For example, the created object may be dragged into the trash bin (or recycling bin, not shown) of the desktop so that it will be deleted when a garbage collection operation occurs. If a user later needs the same object again, the user can recreate it by again selecting the choice-item in an unfurled menu and hot keying on the selected choice-item so as to produce a drag-and-drop object from the selected choice-item.

Figure 5:
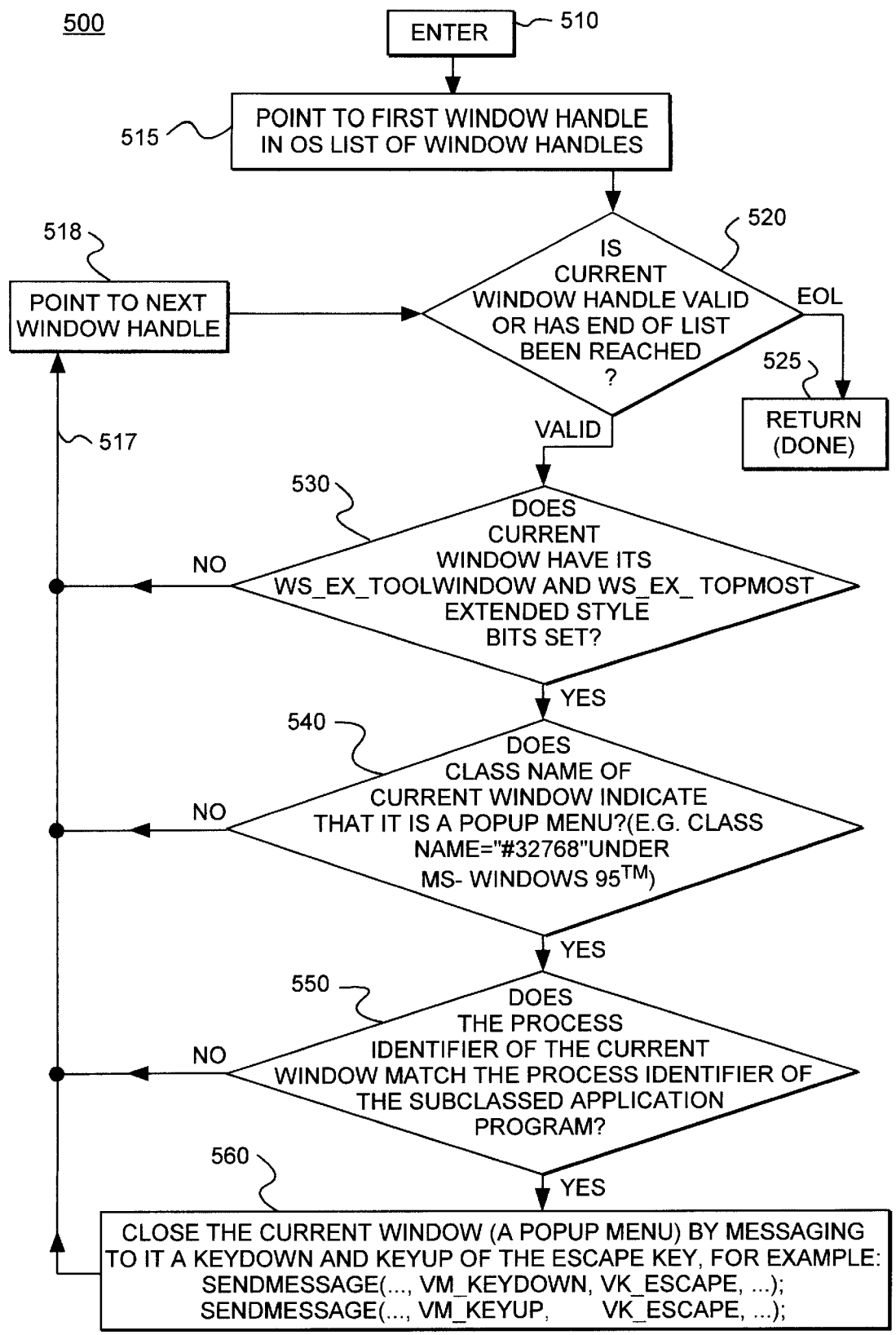
FIG. 5 illustrates a method for locating the Window Handle of the choice-listing menu that is the source of the drag-and-drop object and closing that choice-listing menu.

Referring to FIG. 5, one method 500 for closing currently open popup menus (as called for in step 460) is shown. Method 500 applies to the Microsoft Windows 3.1™ or Microsoft Windows95™ operating systems. Similar methods may be used for other OS's.

The close popup menus subroutine 500 is entered at step 510.

At step 515, a pointer is set to point to a first window handle in the OS's list of window handles. A popup menu (choice-listing menu) is treated as a special kind of window by the OS. The aim here is to locate and close all the open choice-listing menus of the currently subclassed application program.

At step 520, a test is conducted to see if the end of the window handles list (EOL, end of list) has been reached. The last entry in the list is an invalid one or an EOL marker. If such an end of list has been reached, an exit (return on 'done state') is taken by way of step 525.

At step 530, a test is conducted to see if certain style bits associated with popup menus are set. In the Microsoft Windows 3.1™ or Microsoft Windows95™ operating systems these are the WS_EX_TOOLWINDOW extended style bit (which indicates a 'floatable' window) and the WS_EX_TOPMOST extended style bit (which indicates the window is shown in the foreground rather than being in the background). Testing for these bits quickly rules out many possibilities that would not qualify under one of the subsequent tests (540 and 550). Because so many nonqualifying possibilities can be ruled out with such a simple bit-masking test, step 530 is preferably carried out in the qualifying test chain before steps 540 and 550. If the answer is No in test step 530, the current window handle is clearly not for a popup menu and path 517 is followed to step 518.

Step 518 increments the current window pointer to point to the next window handle and transfers control to step 520.

If the answer is Yes to the test performed at step 530, a further filtering test is performed at step 540. Not all windows that pass muster under test 530 are popup menus. In step 540 a test is conducted to see if the class name corresponds to that of a popup menu. This test is often more time consuming than the bit-masking test of step 530 and is therefore preferably carried out after step 530 so as not to waste system time on window handles that can be filtered out by faster test 530. In the Microsoft Windows 3.1™ or Microsoft Windows95™ operating systems the so-indicative class name for popup menus is designated as "#32768". If the answer is No, the current window handle is not for a popup menu and path 517 is followed to step 518.

Not all popup menus are to be closed however. If the answer is Yes to the test performed at step 540, a next filtering test is performed at step 550 to pick out only those popup menus belonging to the subclassed application program now having one of its choice-items converted into a drag-and-drop object. In step 550 this is done by testing to see if the process identifier of the current Window matches the process identifier of the subclassed application program that is having its choice-item converted. If the answer is No, the current popup menu does not belong to the current application program and path 517 is followed to step 518.

On the other hand, if the answer has been Yes to each of tests 530, 540 and 550, the next step performed is step 560. In step 560 one or more messages are sent to the current window (the current popup menu) to cause it to close. One way of doing this is by indicating depression and release of the ESCAPE key as shown by way of example in FIG. 5.

The subclassed application program that is now having one of its choice-items converted into a drag-and-drop object can have multiple levels of submenus open. After step 560 is performed, control is passed to step 518 via path 517. The loop is repeated until there are no more windows open that qualify under the tests performed by steps 530, 540, 550 and 520. At the end of the window handles list, an exit (or return out of subroutine) is taken by step 525.

The specific actions to be performed when a choice-item of a subclassed application program is converted into a drag-and-drop object depend on the factors listed above, mainly, the point of origin of the drag-and-drop object and the point of deposit of the object.

A first set of actions in accordance with the invention convert a 'function' choice-item into a drag-and-drop object and deposit the dragged object onto an open desktop area.

The term, 'function' choice-item refers to choice-items that when invoked, cause a particular program to execute independent of a specific data file. Examples include choice-items having names such as OPEN, SAVE_AS, MAIL, CUT, COPY, and PASTE. For some of these, the user is expected to supply further information in order for the function to complete. In the case of FILE OPEN for example, the user has to indicate what specific file is to be opened. In the case of FILE SAVE_AS, the user is expected to indicate the name of the new file into which the current data is to be saved. In the case of MAIL, the user is expected to indicate the name or names of the entities to whom e-mail is to be sent.

There are a number of advantages to using an immediately-executable 'function' object located on the open desktop instead of using a choice-item hidden in a yet-to-be unscrolled choice-listing menu. These advantages are particularly important for those specific functions that a user finds him/herself using with greater regularity than most other menu-borne functions. First, the user avoids extra steps such as having to navigate through a series of menus and submenus. The user clicks directly on the dragged-and-dropped object to have the function immediately performed. Second, the functional capability of the dragged-and-dropped object is constantly being advertised to the user on the desktop rather than being hidden as a choice-item in an unscrolled menu. Given this, the user may be better able to recall that the particular function is available. Third, the position and size of the dragged-and-dropped object remains constant on the open desktop irrespective of where the application program window is moved or how the application program window is sized. This consistency may be advantageous in certain situations such as when users are periodically 'minimizing' application program windows and placing the shrunken versions on the taskbar even though it is desirable to perform certain program-internal functions. (The menu bar, e.g. 115 of a minimized window is not visible and hence cannot be immediately used for unfurling a choice-listing menu.)

A second set of actions in accordance with the invention convert a 'data file' choice-item into a drag-and-drop object and deposit the dragged object onto an open desktop area.

The term, 'data file' choice-item refers to choice-items that when invoked, cause a particular data file to open under a specific application program. Examples include the historical worked-on files discussed above.

The advantages of using an immediately-executable 'data file' object located on the open desktop instead of using a choice-item hidden in a yet-to-be unscrolled choice-listing menu are similar to those described for function objects, namely, (a) the user avoids extra steps such as opening the application program and navigating through a series of menus and submenus to get to the desired choice-item, (b) the availability of the dragged-and-dropped 'file data' object is constantly being advertised to the user rather than being hidden as a choice-item in an unscrolled menu, (c) the position and size of the dragged-and-dropped object remains constant on the open desktop, and (d) even if the name of the specific data file rolls past the end of the History . . . tracking portion in the application's choice-listing menu, it is nonetheless preserved by the created 'data file' object.

The application program that is launched when double-clicking on a 'data file' object created in accordance with the invention is not limited to word processors. As explained above, all other forms of application programs that use data files may be launched including spreadsheet programs, financial tracking programs, modeling programs, picture-drawing programs, and so forth.

A third set of actions in accordance with the invention convert a 'net download' choice-item into a drag-and-drop object and deposit the dragged object onto an open desktop area.

The term, 'net download' choice-item refers to choice-items that when invoked, cause data to be downloaded over a communications network from a particular source site to nonvolatile storage the user's computer under the supervision of a specific network using program. One example of this is discussed above and referenced as an 'external' download file which is named in a 'favorites' choice-listing menu of an Internet or Intra-net browsing program. The download can be by FTP (File Transfer Protocol) or HTTP (HyperText Transfer Protocol) or any other download protocol.

Figure 6:
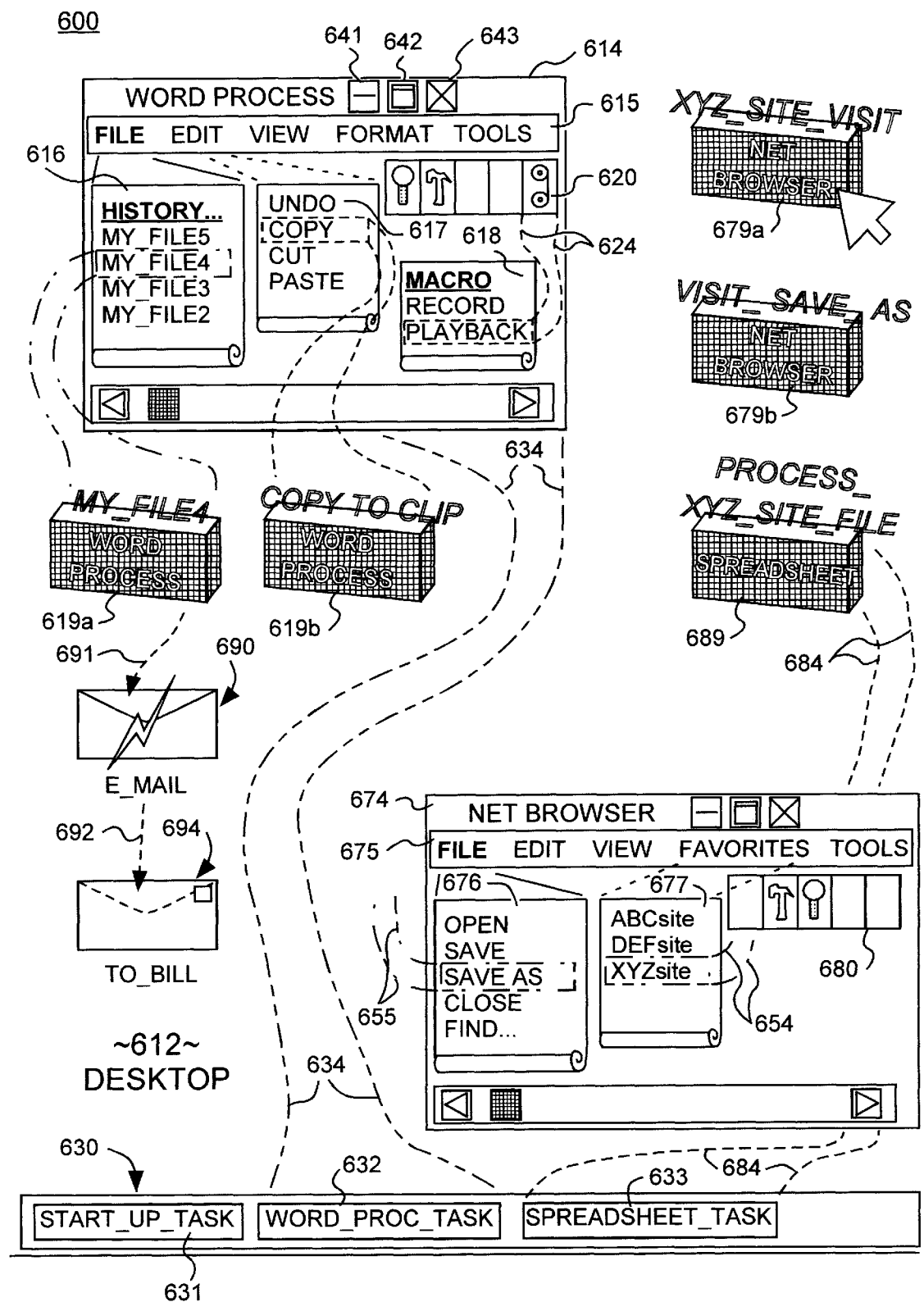
FIG. 6 illustrates further operations that may be carried out on a GUI desktop after converting choice-items into drag-and-drop objects.

FIG. 6 illustrates some of the above points. Like reference numerals in the '600' number series are used in FIG. 6 where possible to represent like references elements of FIG. 3 that were numbered in the '300' series. As such in the embodiment 600 of FIG. 6 it is understood that: 612 is a GUI desktop, 614 is an opened window containing a first application program such as a word processing program, 615 is a menu-dropping bar, 616 is a first dropped menu containing file history information, 617 is a second dropped menu (dropped at a different time) that contains choice-items representing editing functions such as COPY (to clipboard), 619a is a first dragged-and-dropped object that was created in accordance with the invention by right-dragging the MY_FILE4 choice-item from menu 616, and 619b is a second dragged-and-dropped object that was created in accordance with the invention by right-dragging the COPY choice-item from menu 617. Note that for dragged-and-dropped objects 619a and 619b the name of the originating application program (e.g., Word Process) is indicated on the front face of the rectangular icon. Other means can of course be used for indicating the originating application program such as changing the shape of the representative icon. Note further that for object 619b, the user has renamed the marquee title to read COPY TO CLIP so as to more clearly indicate that whatever happens to be selected in window 614 will be copied to the system clipboard.

FIG. 6 shows some additional features not previously discussed with respect to FIG. 3. Desktop 612 includes a 'task bar' 630. This task bar 630 generally contains one or more task buttons such as 631, 632 and 633. Each task button may be used to expand a previously shrunken window. Clicking on task button 631 for example brings a start_up window out onto the desktop 612.

Window 614 is shown to contain, in addition to a close-window button 643 (X in a square), a window maximizing button 642 (square in a square), and a window minimizing button 641 (flatten edge in a square). Clicking on the window minimizing button 641 causes window 614 to shrink in size until its internal contents are no longer visible and it further causes the shrunken window to move to a button position inside of task bar 630. This new position can be task button 632 for example. The shrinking of window 614 and its movement into the form of task button 632 is represented by dashed lines 634.

Of importance, when window 614 is minimized, its minimal representation 632 does not provide the user with immediate access to the menu-dropping bar 615. In the past, if the user wanted to invoke the COPY function of bar 615 after window 614 had been minimized, the user generally had to click on task button 632 so as to return window 614 to its original size, and to then click on the EDIT portion of menu-dropping bar 615, and to then select and activate the COPY choice-item. However, with the dragged-and-dropped COPY object 619b now present on the desktop 612, a user can simply click on the COPY_TO_CLIP object 619b, even if window 614 is still minimized. Whatever was selected inside shrunken window 614 will be copied to the system clipboard for retrieval by some other application program (e.g., an electronic mailing program).

For completeness, and as will be understood by GUI users, the maximizing button 642 of window 614 causes that window 614 to expand to fill the display area to the maximum extent possible.

The menu-dropping bar 615 of the WORD PROCESS window is shown to include a TOOLS area. Clicking on the TOOLS area causes a choice-listing menu (not shown) to unfurl and display as choice-items a variety tool functions. The tool functions can include spell-checking, grammar-checking, clip-art fetch, and so forth.

Sometimes, an application program provides a 'tool bar' capability such as shown at 620. The tool bar 620 contains a set of tool icons (e.g., magnifying glass, hammer, etc.) each representing a specific tool function in nonliteral form. The user is allowed to click on the tool icon and invoke a corresponding tool function in place of locating the tool function in a choice-listing menu and activating the same function through the latter path.

Most application programs unfortunately provide only a limited number tools within the tool bar 620 and no simple way for changing the tool set contained in the tool bar 620. In accordance with the invention, however, tool choice-items from a tools choice-listing menu can be converted to drag-and-drop objects and dragged into a tool bar 620 to add a corresponding new tool to the tool bar 620.

In the illustrated example, 618 is a 'Macro' portion of an unfurled tools menu. One of the Macro choice-items is PLAYBACK. The corresponding PLAYBACK function plays back a specified macro. A Macro is formed by recording a sequence of actions within an application program for later playback within that application program.

Although not shown, it is to be understood that a Macro PLAYBACK choice-item often times unfurls to display a submenu of macro functions, one of which is to be selected and activated for playback. The present invention contemplates the conversion of choice-items from such a submenu into drag-and-drop objects that are moved to the tool bar 620.

Alternatively, as shown in FIG. 6, the Macro PLAYBACK choice-item may itself be converted (by right-dragging) into a drag-and-drop object that is deposited into the tool bar 620 for thereby adding a new tool icon. In the illustrated example, the Macro PLAYBACK choice-item is so-converted and used to produce the icon with two-reels and tape extended between them. Dashed lines 624 represent the conversion of the Macro PLAYBACK choice-item into a drag-and-drop object and the dropping of that object into the tool bar 620. The conversion of the drag-and-drop object into an application tool can be mediated either by the application program being originally configured to so respond to the OS's data transfer protocol (e.g., OLE or DDE) or by the application program having been subclassed to so carry out the conversion of the dragged-and-dropped object into the corresponding tool in response to the drop operation.

FIG. 6 shows a second window 674 as having been opened on the desktop 612. In this example, a network-using program such as an Internet browser (fictitiously named, NET BROWSER) is running within second window 674. The menu-dropping bar 675 of second window 674 includes a FAVORITES area which may be clicked on to unfurl a favorites choice-listing menu 677. Within the favorites choice-listing menu 677 are a plurality of choice-items representing favorite network sites of the user. By way of example they are fictitiously named in FIG. 6 as the ABCsite, the DEFsite and the XYZsite. Each could be a web site on the Internet or a site on another kind of network.

Dashed lines 654 indicate that the XYZsite choice-item has been right-dragged onto the open desktop in accordance with the invention and thereby converted into executable object 679a. The marquee title of object 679a has been renamed by the user to read as XYZ_site_VISIT so that its function is more clearly understood than the original title of the source choice-item, XYZsite. Double clicking on this executable XYZ_site_VISIT object 679a invokes an automatic launching of the associated application program (NET BROWSER) and an execution of the function underlying the FAVORITES XYZsite choice-item. In other words, it automatically invokes a visit to the XYZsite on the associated network.

The menu-dropping bar 675 of second window 674 further includes a FILE area which may be clicked on to unfurl a FILE-functions choice-listing menu 676. FILE-functions of menu 676 are directed to files that are operated on by the NET BROWSER program.

Dashed lines 655 indicate that the SAVE_AS choice-item of menu 676 has been right-dragged onto the open desktop in accordance with the invention and has been thereby converted into executable object 679b. The marquee title of object 679b has been renamed by the user to read as SAVE_VISIT_AS so that its function is more clearly understood than the original title of the source choice-item, SAVE_AS (by 655). Double clicking on this executable SAVE_VISIT_AS object 679b invokes the corresponding FILE-function of the associated application program (NET BROWSER). In other words, it automatically causes whatever data is open within second window 674 to be saved under a user-provided file name.

FIG. 6 indicates that there was a third window (not shown) previously opened on the desktop 612 and running a spreadsheet program (fictitiously named, SPREADSHEET). This third window has been minimized into third task button 633.

Before minimization, however, a FILE-HISTORY choice-item (not shown) of the third window was converted in accordance with the invention into a drag-and-drop object that was dropped at 689. The so-converted FILE-HISTORY choice-item (not shown) of the third window choice-item references the same file as is saved by object 679b so that the functions of objects 679b and 689 can be executed in succession to respectively save data from a visited favorite site (XYZsite) to disk under a given name and to thereafter launch the SPREADSHEET program and open the just-saved disk file for further processing by the SPREADSHEET program. In the illustrated example, the user has renamed the marquee title of object 689 to read as PROCESS XYZ_site_FILE so that the function of object 689 is more clearly understood than the original title of the source choice-item, HISTORY . . . \XYZ_SITE_FILE (not shown).

Dashed lines 684 indicate that the HISTORY . . . \XYZ_SITE_FILE choice-item (not shown) of the now-shrunken spreadsheet window had been right-dragged onto the open desktop in accordance with the invention and had been thereby converted into executable object 689, and that thereafter the third window had been minimized into the form of third task button 633.

In view of the above, it is seen that a fourth set of actions in accordance with the invention convert a 'net_site visit' choice-item (in 677) into a drag-and-drop object and deposit the dragged object (679a, XYZ_SITE_VISIT) onto an open desktop area.

The term, 'net_site visit' choice-item refers to choice-items that when invoked, cause a particular network site such as an Internet Web site to be visited over a communications network and the contents of the site to be made viewable on the user's computer under the supervision of a specific network browsing program (e.g., NET BROWSER of window 674). One example of such a choice-item is that which comes within a 'favorites' or 'bookmarks' choice-listing menu 677 of an Internet or Intra-net browsing program. Double-clicking on the dragged-and-dropped object 679a that was created from the 'favorites' or 'bookmarks' choice-listing menu causes the browser to be launched and the favorite site to be automatically visited.

A fifth set of actions in accordance with the invention convert an 'e-mail addressee' choice-item into a drag-and-drop object and deposit the dragged object onto an open desktop area.

The term, 'e-mail addressee' choice-item refers to choice-items that when invoked, cause a particular e-mail address to be inserted into a 'Send_To' field of an e-mailing program. Double-clicking on the dragged-and-dropped object created from such an 'e-mail addressee' choice-item causes the corresponding electronic mailing program to be launched and the e-mail address of the specified addressee to be automatically copied into the 'Send_To' field of an e-mail letter under composition. The conversion of the dragged-and-dropped object into such an on-the-desktop, application-launching and initiating tool can be mediated either by the application program having been originally configured to, at the time of the choice-item right-drag operation, so generate the corresponding instructions in accordance with the OS's data transfer protocol (e.g., OLE or DDE) or by the application program having been subclassed to so produce the conversion instructions for converting the dragged-and-dropped object into the corresponding on-the-desktop tool in response to the right-drag operation.

A sixth set of actions in accordance with the invention convert a function choice-item (e.g., in 618) into a drag-and-drop object and deposit (624) the dragged object onto a toolbar area (620) of an opened window so as to add the functionality of the dragged-and-dropped object to the tool bar. Note that this is different from the dropping of a dragged object onto an open desktop area. The conversion of the drag-and-drop object into an application toolbar item can be mediated either by the application program being originally configured to so respond to the OS's data transfer protocol (e.g., OLE or DDE) or by the application program having been subclassed to so carry out the conversion of the dragged-and-dropped object into the corresponding tool in response to the drop operation.

One example of such tool creation, as shown in FIG. 6 at 624, involves the 'Macro' function found in many application programs. A given Macro is formed by recording a sequence of actions within an application program and storing these actions under a particular macro filename for later playback within the same application program. Often the user has to navigate through multiple menus and submenus to reach the desired 'Macro Playback' function. In accordance with the invention, however, the choice-item that represents the desired 'Macro Playback' function is converted into a drag-and-drop object. The created drag-and-drop object is then dragged-and-dropped over a tool bar area. The object-receiving tool bar area converts the received object into an in-bar tool (such as the tape-and-reels shown in toolbar 620). Clicking on the in-bar tool invokes the desired 'Macro Playback' function.

In addition to, or besides the 'Macro Playback' function, many application programs have further 'tool' functions that are hidden as choice-items in low level submenus. Examples include the 'spell-checking', 'grammar-checking' and 'thesaurus-substitute' functions. such tool functions may be found in a word processor or in a host of other kinds of application programs including even picture-drawing programs and spreadsheet generating programs. In accordance with the invention, the choice-item that represents a desired 'tool' function is converted into a drag-and-drop object. The created drag-and-drop object is then dragged-and-dropped over a tool bar area. The object-receiving tool bar area then converts the received object into an in-bar tool. Clicking on the in-bar tool invokes the newly-added 'tool' function. In this way, the user can bring a favorite tool of the user to the forefront for quicker access and activation.

Another example of tool creation involves the 'favorites' or 'bookmarks' choice-listing menu found in web browsers and like net-using application programs. The same net-using application programs often include a tool bar 680. In accordance with the invention, the choice-item that represents a desired net-site address (e.g., XYZsite) is converted into a drag-and-drop object. Instead of dropping onto an open desktop area, the created drag-and-drop object is dragged-and-dropped over a tool bar area (680). The object-receiving tool bar area converts the received object into an in-bar tool. Clicking on the so-created in-bar tool causes the net-using application program to access the corresponding 'favorite' site (XYZsite). Such an access can be in the form of a web-site visit or an ftp file-download or a newsgroup exchange, as appropriate. In this way, the user can bring a favorite network-using activity of the user to the forefront as an activatable tool that provides more convenient access to the favorite network-using activity.

A seventh set of actions in accordance with the invention convert a function choice-item of a first application program (e.g., WORD PROCESS) into a drag-and-drop object and deposit the dragged object onto another object representing a second application program (e.g., E_MAIL or SPREADSHEET). The receiving application program absorbs the dropped object and reacts according to its specific programming. Note that the dragging-and-dropping of a first choice-item-sourced object onto a second object (which second object represents another application) is different than dropping a dragged object onto an open desktop area or onto an in-application tool bar. The inter-application transference and the by-transit conversion of the dragged-and-dropped object into an appropriate object within the second application window can be mediated either by the first and second application programs having been originally configured to so coordinate with one another using the OS's data transfer protocol (e.g., OLE or DDE) or by one or both of the first and second application programs having been subclassed to so carry out the conversion of the dragged-and-dropped object into the corresponding object in response to the right-drag and drop operation.

One example of such dropping of a first choice-item-sourced object into a second object involves e-mailing programs. In accordance with the invention, a historical file-name choice-item is right-dragged from the FILE menu or a HISTORY submenu thereof and the resulting object (e.g., 619a) is dropped onto a second object (second icon, e.g. 690) representing an e-mailing program. This operation is represented by dashed path 691 in FIG. 6. The drop causes the e-mailing program 690 to start up and to automatically generate a new e-mail letter containing the contents (text or other) of the data file (e.g., MY_FILE4) associated with the dropped file object (e.g., 619a). The user thereby bypasses the conventional procedure of manually launching the e-mailing program 690 by double-clicking on its icon and thereafter using a FILE OPEN function of the e-mailing program to locate and fetch the desired material (e.g., that which is stored in MY_FILE4).

In a variation of the above, the dropped first object becomes an 'attachment' to the generated e-mail letter rather than part of the body of the letter. The determination of whether mail-insertion or mail-attachment should be carried out, can be made based on the 'extension' parameters of the right-dragged object. For example, if the filename of the dragged object ends with a dot-TXT (or ".txt") extension, it can be assumed that the contents of the named file are encoded in ASCII or an OS accepted format, and as such it is safe to embed the contents directly into the e-mail message as an insertion. On the other hand, if the filename of the dragged object ends with a dot-DOC extension (or ".doc", or ".wpd", where the last named extension indicates a word processing document encoded according to the WordPerfect™ format of Corel Corp.), it can be assumed that the contents of the named file are encoded in a nongeneric format, and as such should be 'attached' as a separate file to the e-mail message rather than being directly embedded as part of the contents of the e-mail message.

This discriminative sensitivity to the extension portion of a filename can be further applied to others of the right-drag and drop operations described herein. For example, the response of the receiving area of a {right-drag}-and-drop operation in accordance with the invention may respond differently if the filename extension categorizes the corresponding file as one such as '.exe' or '.com' or '.bat' or '.dll' which indicates an executable file; or if the filename extension instead types the file as one such as '.bmp' or '.gif' which indicates a graphic image file; or if the filename extension alternatively categorizes the corresponding file as one such as '.ini' which indicates a user preference file; or if the filename extension designates the file as one such as '.txt' or '.doc' which indicates a file containing text encoded according to a particular format.

Like many NET BROWSER programs, a number of e-mail programs may provide a 'favorites' or 'bookmarks' or 'address book' choice-listing menu that lists addresses of persons/entities to whom the user most frequently send e-mail. (The favorite e-mail recipients may be alternatively listed in an e-mail 'aliases' or 'addresses' menu.) An eighth set of actions in accordance with the invention enable the user to right-drag (or otherwise convert) a 'favorites' or like choice-item out of an e-mail program and to drop it on the open desktop so as to create a 'favorite addressee' object 694 such as the one entitled TO__BILL in FIG. 6. Path 692 represents such a creation of 'favorite addressee' object 694. Next, a filename choice-item (e.g., MY__FILE4) can be dragged out of a second application program (e.g., WORD PROCESS) and dropped on the 'favorite addressee' object 694. The contents of the corresponding file (e.g., MY__FILE4) are then automatically copied into or attached to an e-mail letter and the letter is automatically sent to the 'favorite addressee' (e.g., TO__BILL).

As with the above described other processes involving the {right-drag}-and-drop operation in accordance with the invention, the inter-application transference and the by-transit conversion of the dragged-and-dropped object into an appropriate object within the receiving area can be mediated either by the first and second application programs having been originally configured to so coordinate with one another using the OS's data transfer protocol (e.g., OLE or DDE) or by one or both of the first and second application programs having been subclassed to so carry out the conversion of the dragged-and-dropped object into the corresponding object in response to the {right-drag}-and-drop operation. The reference, "Inside OLE", $2^{nd}$ edition, by Kraig Brockschmidt, MS Press is cited here as a sample description of how OLE may be used for inter-application transference of objects.

An ninth set of actions in accordance with the invention enable the user to convert a 'favorites' choice-item originating in an e-mail program into an Internet chat-site address. To do this, an addressee-identifying choice-item is right-dragged out of the e-mail program's window (690 after double-clicking thereon) and dropped onto a NET BROWSER icon (674 before it is opened as a window by double-clicking on the NET BROWSER icon). In response, the receiving NET BROWSER icon automatically opens, locates an Internet chat-group address for the person/entity identified by the dropped e-mail address object, and establishes a chat-session with the so-identified person/entity.

As a variation on the above, instead of establishing a chat session, the dropped e-mail address object could alternatively establish an over-network video conferencing session with the so-identified person/entity.

As yet another variation on the above, instead of establishing a chat session, the dropped e-mail address object could alternatively cause the NET BROWSER 674 to automatically visit the World Wide Web (WWW) page of the so-identified person/entity.

A tenth set of actions in accordance with the invention enable the user to intelligibly view specially-formatted files by using the choice-item converting process of the invention.

For example, a first choice-listing menu may list a set of files that are encoded according to HTML format (HyperText Markup Language). A corresponding HTML viewing program is generally needed to intelligibly view the graphics within the HTML file in accordance with the intents of its author. If a desired HTML file is listed as a choice-item in a choice-listing menu, the user is allowed to right-drag (or otherwise convert) into a drag-and-drop object and to drop the object on the icon of a NET BROWSER (674) or on the icon of another HTML viewing application program. The receiving icon automatically launches its program and opens the identified HTML file for viewing.

Similar functions can be performed with other specially-encoded data files. Suppose for example that a text file (e.g., having a dot-TXT extension) is listed as a choice-item in a menu and the user wants to listen to the message contained in the text file rather than reading it. The user can be allowed to right-drag (or otherwise convert) the text file choice-item so as to produce a corresponding drag-and-drop object and to drop the object on the icon of a TEXT-TO-SPEECH converting program. This action causes the receiving icon to automatically launches its TEXT-TO-SPEECH converting program, to open the identified text file (.TXT), and to automatically begin outputting the contained message as speech through an appropriate speech output device.

Suppose as a further example that a music file (e.g., having a dot-WAV extension) is listed as a choice-item in a menu and the user wants to listen to the music (or other audio information) contained in the so-identified music file. The user can be allowed to right-drag (or otherwise convert) the music file choice-item so as to create a corresponding drag-and-drop object and to drop the object on the icon of an AUDIO-REPRODUCING program. This action causes the receiving icon to automatically launches its AUDIO-REPRODUCING program, to open the identified music file (.WAV), and to automatically begin outputting the contained audio information as sound through an appropriate sound output device.

Suppose as yet a further example that a picture file (e.g., having a dot-BMP extension or a dot-GIF extension or a dot-PCX extension or some other picture defining format) is listed as a choice-item in a menu and the user wants to view the picture contained in the so-identified picture file. The user can be allowed to right-drag (or otherwise convert) the picture file choice-item so as to create a corresponding drag-and-drop object and to drop the object on the icon of a PICTURE-VIEWING program. This action causes the receiving icon to automatically launches its PICTURE-VIEWING program, to open the identified picture file (e.g., MY__PICTURE.BMP), and to automatically begin outputting the contained graphic information as a picture through an appropriate graphics output device (e.g., the computer's monitor 110).

The above disclosure is to be taken as illustrative of the invention, not as limiting its scope or spirit. Numerous modifications and variations will become apparent to those skilled in the art after studying the above disclosure.

It is to be understood for example that the {right-drag} operations described above for specially keying on the choice-item that is to be converted into a drag-and-drop object can be substituted for by other hot keying sequences such as depressing a right or middle trackball button while simultaneously rolling the trackball so as to indicate a special drag operation. A control key (Ctrl or Alt or Shift) can alternatively be depressed on the keyboard while a mouse or trackball or joystick is moved so as to define the hot keying sequence that initiates conversion of the desired choice-item into a drag-and-drop object.

Given the above disclosure of general concepts and specific embodiments, the scope of protection sought is to be defined by the claims appended hereto.

What is claimed is:

1. A machine-implemented method for using choice-items presented in a choice-listing menu for functions other than choice-item selection or choice-item activation, said method comprising the steps of:

(a) detecting selection of a presented choice-item;

(b) identifying object specifications of the selected choice-item;

(c) detecting special keying on the selected choice-item, where the special keying indicates a request for producing a drag-and-drop object from the selected choice-item; and (d) using the identified object specifications of the selected choice-item that was specially keyed on to generate a drag-and-drop object.

2. A machine-implemented method according to claim 1 wherein the implementing machine has an operating system (OS) that detects events and said step (a) of detecting selection includes:

(a.1) subclassing an application program to cause the subclassed application program to request an OS callback to a menu monitoring routine each time the OS detects an event involving the subclassed program;

(a.2) determining within the menu monitoring routine whether the OS-detected event is a movement-invoked selection of a next choice-item.

3. A machine-implemented method according to claim 2 further comprising between said step (b) of identifying and said step (c) of detecting the step of:

(b.1) copying the identified object specifications of the selected choice-item into a buffer that is later accessible to the menu monitoring routine at the time of said step (d) of using the identified object specifications.

4. A machine-implemented method according to claim 2 wherein said implementing machine comprises a movable mouse having left and right depressible buttons and further wherein said step (c) of detecting special keying includes:

(c.1) determining within the menu monitoring routine whether the OS-detected event indicates completion of a mouse right-button depression and a mouse dragging movement over an area associated with the selected choice-item.

5. A machine-implemented method according to claim 2 wherein said operating system (OS) produces drag-and-drop objects in response to passed requests for production of such drag-and-drop objects and in further response to passed object specifications defining attributes of the to-be-produced drag-and-drop objects, and wherein said step (d) of using includes:

(d.1) passing the identified object specifications of the specially keyed on choice-item to the OS; and (d.2) transmitting to the OS a request to produce a drag-and-drop object based on the passed object specifications.

6. A machine-implemented method according to claim 2 further comprising between said step (c) of detecting special keying and said step (d) of using, the step of:

(c.1) closing the choice-listing menu in which the specially keyed on choice-item was presented.

7. A machine-implemented method according to claim 6 wherein the choice-listing menu in which the specially keyed on choice-item was presented is a submenu of one or more other opened choice-listing menus and wherein between said step (c) of detecting special keying and said step (d) of using, the method further comprises the steps of:

(c.2) closing the one or more other opened choice-listing menus.

8. A machine-implemented method according to claim 1 wherein said implementing machine comprises a graphically-oriented user input device having means by which the user can request movement of a displayed graphical object and further wherein said step (c) of detecting special keying includes:

(c.1) detecting a user request presented by way of said graphically-oriented user input device for movement of the selected choice-item; and (c.2) detecting a simultaneous user request presented by simultaneous depression of a pre-assigned button for a special drag of the selected choice-item, said special drag indicating a request for initiating a drag-and-drop operation.

9. A machine-implemented method according to claim 1 further comprising the steps of:

(e) allowing the generated drag-and-drop object to be dropped on a user-selected receiving area; and (f) producing in the user-selected receiving area, a dropped object having properties defined by an inter-application transfer to the receiving area of said object specifications.

10. A machine-implemented method for use with a plurality of choice-items presented in one or more choice-listing menus, wherein choice-items can be normally keyed on to invoke respective normal functions associated with the choice-items, said method comprising the steps of:

(a) detecting special keying on a selected choice-item that is displayed in a source area within an opened choice-listing menu, where the special keying indicates a request for dragging the selected choice-item away from of the opened choice-listing menu; and (b) generating a drag-and-drop object from the selected choice-item that was specially keyed on.

11. A machine-implemented method for use with a plurality of choice-items presented in one or more choice-listing menus, said method comprising the steps of:

(a) detecting special keying on a selected choice-item that is displayed in a source area within an opened choice-listing menu, where the special keying indicates a request for dragging the selected choice-item away from of the opened choice-listing menu;

(b) generating a drag-and-drop object from the selected choice-item that was specially keyed on:

(c) allowing the generated drag-and-drop object to be dropped on a user-selected receiving area; and (d) producing in the user-selected receiving area, a dropped object having properties defined by the user-selected receiving area and by the source area.

12. A machine-implemented method according to claim 11 wherein:

(a.1) the selected choice-item that was specially keyed can be a historical filename of a data file previously worked on under an associated application program;

(c.1) the user-selected receiving area can be an open desktop area; and (d.1) when the user-selected receiving area is such an open desktop area, and the selected choice-item that was specially keyed on is such a historical filename, said producing step produces a shortcut object on the open desktop area for automatically launching the associated application program and simultaneously opening the named historical data file from within the launched application program.

13. A machine-implemented method according to claim 11 wherein:

(a.1) the selected choice-item that was specially keyed can be a net_favorite FileName representation of a file that is frequently downloaded by way of a network;

(c.1) the user-selected receiving area can be an open desktop area; and (d.1) when the user-selected receiving area is such an open desktop area, and the selected choice-item that was specially keyed on is such net_favorite FileName representation, said producing step produces a shortcut object on the open desktop area for automatically launching a Notification Program that, when invoked, tests an external version of the file identified by said net_favorite FileName for changes relative to a local copy that has been previously downloaded, and if there are differences, fetches the latest version from over the network.

14. A machine-implemented method according to claim 11 wherein:
   (a.1) the selected choice-item that was specially keyed can be a network sitename displayed in a sitename recording menu within a network browsing program;
   (c.1) the user-selected receiving area can be an open desktop area; and
   (d.1) when the user-selected receiving area is such an open desktop area, and the selected choice-item that was specially keyed on is such a network sitename, said producing step produces a shortcut object on the open desktop area for automatically launching the network browsing program and automatically seeking the network site identified by the sitename.

15. A machine-implemented method according to claim 11 wherein:
   (a.1) the selected choice-item that was specially keyed can be an e-mail address displayed in an address recording menu within an electronic-mail program;
   (c.1) the user-selected receiving area can be an open desktop area; and
   (d.1) when the user-selected receiving area is such an open desktop area, and the selected choice-item that was specially keyed on is such a e-mail address, said producing step produces a shortcut object on the open desktop area for automatically launching the electronic-mail program and automatically addressing an e-mail message to the addressee identified by the e-mail address.

16. A machine-implemented method according to claim 11 wherein:
   (a.1) the selected choice-item that was specially keyed can be a function choice-item displayed in a functions listing menu within an application program;
   (c.1) the user-selected receiving area can be an open desktop area; and
   (d.1) when the user-selected receiving area is such an open desktop area, and the selected choice-item that was specially keyed on is such a function choice-item, said producing step produces a function object on the open desktop area for invoking the identified function from the desktop.

17. A machine-implemented method according to claim 11 wherein:
   (a.1) the selected choice-item that was specially keyed can be a tool choice-item displayed in a tools listing menu within an application program;
   (c.1) the user-selected receiving area can be a toolbar area; and
   (d.1) when the user-selected receiving area is such a toolbar area, and the selected choice-item that was specially keyed on is such a tool choice-item, said producing step produces a tool object in the toolbar area for invoking the corresponding tool function from the toolbar.

18. A machine-implemented method according to claim 11 wherein:
   (a.1) the selected choice-item that was specially keyed can be a first choice-item displayed in a first listing menu within a first application program;
   (c.1) the user-selected receiving area can be an executable object that when invoked launches a second application program; and
   (d.1) when the user-selected receiving area is such an executable object, and the selected choice-item that was specially keyed on is such a first choice-item, said producing step transfers object specifications of the first choice-item to the second application program.

19. A machine-implemented method according to claim 11 wherein:
   (a.1) the selected choice-item that was specially keyed can identify a file having a filename with a file-categorizing extension;
   (c.1) the user-selected receiving area can discriminate between received object specifications having different file-categorizing extensions; and
   (d.1) when the user-selected receiving area is such a discriminator among different file-categorizing extensions, and the selected choice-item that was specially keyed on is such an extension categorized choice-item, said producing step produces different results in response to different file-categorizing extensions.

20. An instructing device adapted for passing execution instructions to an instructable machine, wherein the instructable machine uses choice-items presented in one or more choice-listing menus, wherein choice-items can be normally keyed on to invoke respective normal functions associated with the choice-items, said execution instructions including instructions for causing the machine to perform the steps of:
   (a) detecting special keying on a selected choice-item that is displayed in a source area within an opened choice-listing menu, where the special keying indicates a request for dragging the selected choice-item away from of the opened choice-listing menu; and
   (b) generating a drag-and-drop object from the selected choice-item that was specially keyed on.

21. A computer system comprising:
   (a) display means for displaying a plurality of graphical items including a graphical desktop layer, one or more overlying, graphical windows and a user-movable cursor, wherein at least one of the windows occasionally contains a choice-listing menu presenting a plurality of selectable choice-items;
   (b) a graphically-oriented user input device for manipulating one or more of said graphical items; and
   (c) graphical user interface means for detecting and processing graphically oriented manipulations and producing corresponding results, said graphical user interface means including:
   (c.1) hot key detecting means for detecting special keying by a user on a selected choice-item that is displayed in a source area within an opened choice-listing menu, where the special keying indicates a request for dragging the selected choice-item away from of the opened choice-listing menu; and
   (c.2) object generating means for generating a drag-and-drop object from the selected choice-item that was specially keyed on.

22. A machine-implemented method according to claim 10 wherein the normal functions associated with normal keying on the choice-items include at least one of the functions in the group consisting of: OPEN FILE, SAVE FILE, SAVE FILE AS, RENAME FILE, CLOSE FILE, unfurl FILE HISTORY, and EXIT FILE.

23. A machine-implemented method according to claim 10 wherein the normal functions associated with normal keying on the choice-items include at least one of the functions in the group consisting of: EDIT UNDO, EDIT COPY, EDIT CUT, and EDIT PASTE.

24. A machine-implemented method according to claim 10 wherein the normal functions associated with normal keying on the choice-items include at least an unfurl FILE HISTORY function.

25. A machine-implemented method according to claim 10 wherein the normal functions associated with normal keying on the choice-items include at least one of the functions in the group consisting of: spell-checking, grammar-checking, clip-art fetch, thesaurus-substitute, magnifying glass, and macro-playback.

26. A machine-implemented method according to claim 10 wherein the normal functions associated with normal keying on the choice-items include at least one of the functions in the group consisting of: MACRO RECORD and MACRO PLAYBACK.

27. A machine-implemented method according to claim 10 where the normal functions associated with normal keying on the choice-items include at least one of the functions in the group consisting of: visiting a favorite or bookmarked internet site; performing an ftp file-download; and performing a newsgroup exchange.

28. A machine-implemented method according to claim 10 wherein the normal functions associated with normal keying on the choice-items include at least listing e-mail aliases or addresses.

29. A machine-implemented method according to claim 10 wherein the normal functions associated with normal keying on the choice-items include at least listing specially-encoded data files.

30. A machine-implemented method according to claim 29 wherein the listed, specially-encoded data files include at least one of: HTML files, dot-TXT files, dot-WAV files, dot-BMP files, dot-GIF files, dot-PCX files, and files with other picture defining formats.

31. A machine-implemented method for use with a plurality of choice-items presented in one or more, popped choice-listing menus, wherein said popped choice-listing menus are each temporarily presented in a display area and retracted after use, and wherein such use can include a normal keying on one of the presented choice-items for invoking a respective normal function associated with the normally keyed-on choice-item, said method comprising the steps of:

(a) detecting special keying on a presented choice-item, where the special keying indicates a request for dragging the specially-keyed-on choice-item away from the corresponding choice-listing menu; and (b) generating a drag-and-drop object from the selected choice-item that was specially keyed on.

32. A machine-implemented method according to claim 31 wherein the normal functions associated with normal keying on the choice-items include at least one of the functions in the group consisting of: OPEN FILE, SAVE FILE, SAVE FILE AS, RENAME FILE, CLOSE FILE, unfurl FILE HISTORY, and EXIT FILE.

33. A machine-implemented method according to claim 31 wherein the normal functions associated with normal keying on the choice-items include at least one of the functions in the group consisting of: EDIT UNDO, EDIT COPY, EDIT CUT, and EDIT PASTE.

34. A machine-implemented method according to claim 31 wherein the normal functions associated with normal keying on the choice-items include at least an unfurl FILE HISTORY function.

35. A machine-implemented method according to claim 31 wherein the normal functions associated with normal keying on the choice-items include at least one of the functions in the group consisting of: spell-checking, grammar-checking, clip-art fetch, thesaurus-substitute, magnifying glass, and macro-playback.

36. A machine-implemented method according to claim 31 wherein the normal functions associated with normal keying on the choice-items include at least one of the functions in the group consisting of: MACRO RECORD and MACRO PLAYBACK.

37. A machine-implemented method according to claim 31 wherein the normal functions associated with normal keying on the choice-items include at least one of the functions in the group consisting of: visiting a favorite or bookmarked internet site; performing an ftp file-download; and performing a newsgroup exchange.

38. A machine-implemented method according to claim 31 wherein the normal functions associated with normal keying on the choice-items include at least listing e-mail aliases or addresses.

39. A machine-implemented method according to claim 31 wherein the normal functions associated with normal keying on the choice-items include at least listing specially-encoded data files.

40. A machine-implemented method according to claim 39 wherein the listed, specially-encoded data files include at least one of: HTML files, dot-TXT files, dot-WAV files, dot-BMP files, dot-GIF files, dot-PCX files, and files with other picture defining formats.

41. A manufactured instructing signal for conveying instructions to an instructable machine, wherein the instructable machine displays choice-items presented in one or more choice-listing menus, wherein choice-items can be normally keyed on to invoke respective normal functions associated with the choice-items, said conveyed instructions including instructions for causing the machine to perform the steps of:

(a) detecting special keying on a selected choice-item that is displayed in a source area within an opened choice-listing menu, where the special keying indicates a request for dragging the selected choice-item away from of the opened choice-listing menu; and (b) generating a drag-and-drop object from the selected choice-item that was specially keyed on.

42. A manufactured instructing signal for conveying instructions to an instructable machine, wherein the instructable machine provides a plurality of choice-items presented in one or more, popped choice-listing menus, wherein said popped choice-listing menus are each temporarily presented in a display area and retracted after use, and wherein such use can include a normal keying on one of the presented choice-items for invoking a respective normal function associated with the normally keyed-on choice-item, said conveyed instructions including instructions for causing the machine to perform the steps of:

(a) detecting special keying on a presented choice-item, where the special keying indicates a request for dragging the specially-keyed-on choice-item away from the corresponding choice-listing menu; and (b) generating a drag-and-drop object from the selected choice-item that was specially keyed on.

43. A machine-implemented method for use with a plurality of choice-items presented in one or more choice-listing menus of a first application program, said method comprising the steps of:
   (a) detecting special keying on a selected choice-item that is displayed in a source area within an opened choice-listing menu of the first application program, where the special keying indicates a request for dragging the selected choice-item away from of the opened choice-listing menu;
   (b) generating a drag-and-drop object from the selected choice-item that was specially keyed on;
   (c) allowing the generated drag-and-drop object to be dropped on a receiving area of a second application program; and
   (d) producing in the receiving area of the second application program, a dropped object having properties defined by the receiving area.

44. A machine-implemented method according to claim 43 wherein the second application program is a GUI desktop.

45. A machine-implemented method according to claim 43 wherein the selected choice-item that was specially keyed on represents a favorite or bookmarked internet site.

46. A machine-implemented method according to claim 43 wherein the selected choice-item that was specially keyed on represents an e-mail address.

47. A machine-implemented method according to claim 43 wherein the selected choice-item that was specially keyed on represents a file and the receiving area of the second application program is a 'favorite addressee' object which automatically copies the file dropped thereon into or automatically attaches the file dropped thereon to an e-mail letter and which automatically then sends the letter to a corresponding 'favorite addressee'.

48. A machine-implemented method according to claim 43 wherein the generated drag-and-drop object represents an object which OPENS a pre-identified-file after launching an associated application program.

49. A machine-implemented method according to claim 48 wherein the object which OPENS said pre-identified-file is tucked into a desktop Start_Up folder so that the function of said object which OPENS will be automatically executed when an associated desktop starts up.

50. A machine-implemented method according to claim 43 wherein the generated drag-and-drop object represents an object which performs a function of a shrunken window.

* * * * *